(12) United States Patent
Lee et al.

(10) Patent No.: US 12,021,197 B2
(45) Date of Patent: Jun. 25, 2024

(54) ELECTRODE FOR ION BATTERY, MANUFACTURING METHOD THEREOF, AND BATTERY COMPRISING THE SAME

(71) Applicant: UNIVERSITY—INDUSTRY COOPERATION GROUP OF KYUNG HEE UNIVERSITY, Yongin-si (KR)

(72) Inventors: Chang Woo Lee, Hwaseong-si (KR); Sekar Praveen, Yongin-si (KR)

(73) Assignee: UNIVERSITY-INDUSTRY COOPERATION GROUP OF KYUNG HEE UNIVERSITY, Youngin-si (KR)

( * ) Notice: Subject to any disclaimer, the term of this patent is extended or adjusted under 35 U.S.C. 154(b) by 138 days.

(21) Appl. No.: 17/531,083

(22) Filed: Nov. 19, 2021

(65) Prior Publication Data

US 2022/0158251 A1    May 19, 2022

(30) Foreign Application Priority Data

Nov. 19, 2020  (KR) ........................ 10-2020-0155613
Nov. 20, 2020  (KR) ........................ 10-2020-0156664

(51) Int. Cl.
*H01M 10/00* (2006.01)
*H01M 4/04* (2006.01)
(Continued)

(52) U.S. Cl.
CPC ..... *H01M 10/0585* (2013.01); *H01M 4/0404* (2013.01); *H01M 2004/027* (2013.01);
(Continued)

(58) Field of Classification Search
CPC .......... H01M 10/0585; H01M 4/0404; H01M 4/505; H01M 4/525; H01M 4/587;
(Continued)

(56) References Cited

U.S. PATENT DOCUMENTS 8,895,101 B2   11/2014  Kwon et al.
9,755,278 B2 *  9/2017  Kwon ............... H01M 10/0565
(Continued)

FOREIGN PATENT DOCUMENTS

JP    2020-119891 A    8/2020
KR    10-2007-0009231 A    1/2007
(Continued)

OTHER PUBLICATIONS

Wang et al.; 3D-Printed All-Fiber Li-Ion Battery toward Wearable Energy Storage; Adv. Funct. Mater. 2017, 27, 1703140, pp. 1-8 (Year: 2017).*

(Continued)

*Primary Examiner* — Cynthia H Kelly
*Assistant Examiner* — Monique M Wills
(74) *Attorney, Agent, or Firm* — NKL Law; Jae Youn Kim

(57) ABSTRACT

A method of fabricating an ion battery for a smart wearable device is proposed. The method includes the steps of: (a) continuously press-printing each of a positive electrode ink composition and a negative electrode ink composition in a coagulation bath and drying the same to manufacture one or more electrode fibers; (b) twisting the electrode fibers to manufacture an electrode assembly; (c) coating the electrode assembly with a separator composition; and (d) placing one or more electrode assemblies in a heat shrinkable tube and introducing a gel electrolyte.

7 Claims, 12 Drawing Sheets

(51) Int. Cl.
*H01M 10/0585* (2010.01)
*H01M 4/02* (2006.01)
*H01M 4/505* (2010.01)
*H01M 4/525* (2010.01)
*H01M 4/587* (2010.01)
*H01M 4/62* (2006.01)

(52) U.S. Cl.
CPC ...... *H01M 2004/028* (2013.01); *H01M 4/505* (2013.01); *H01M 4/525* (2013.01); *H01M 4/587* (2013.01); *H01M 4/623* (2013.01); *H01M 2220/30* (2013.01)

(58) Field of Classification Search
CPC ........... H01M 4/623; H01M 2004/027; H01M 2004/028; H01M 2220/30; H01M 2004/021; H01M 4/0411; H01M 4/139; H01M 10/052; H01M 10/054; H01M 50/102; H01M 50/121; H01M 2004/025; H01M 10/0565; H01M 50/136; H01M 10/058; Y02E 60/10; Y02P 70/50
See application file for complete search history.

(56) References Cited

U.S. PATENT DOCUMENTS

| | | | |
|---|---|---|---|
| 10,008,747 B1* | 6/2018 | Zhamu | H01M 4/0419 |
| 10,923,772 B2 | 2/2021 | Kwon et al. | |
| 11,535,517 B2 | 12/2022 | Harutyunyan | |
| 2014/0377452 A1* | 12/2014 | Kwon | H01M 4/0411 427/58 |
| 2021/0202958 A1 | 7/2021 | Chopra et al. | |

FOREIGN PATENT DOCUMENTS

| | | |
|---|---|---|
| KR | 10-2011-0090768 A | 8/2011 |
| KR | 10-2014-0110622 A | 9/2014 |
| KR | 10-2017-0093755 A | 8/2017 |
| KR | 10-2020-0130650 A | 11/2020 |

OTHER PUBLICATIONS

Sekar Praveen, et al., 3D-printed architecture of Li-ion batteries and its applications to smart wearable electronic devices, (2) Applied Materials Today 20 (2020) 100688.

* cited by examiner

ELECTRODE FOR ION BATTERY, MANUFACTURING METHOD THEREOF, AND BATTERY COMPRISING THE SAME

CROSS-REFERENCE TO RELATED APPLICATION

This application claims priority to and the benefit of Korean Patent Application No. 10-2020-0156664, filed on Nov. 20, 2020 and Korean Patent Application No. 10-2020-0155613, filed on Nov. 19, 2020, the disclosures of which are incorporated herein by reference in their entirety.

BACKGROUND

1. Field of the Invention

The present invention relates to an electrode for an ion battery, a manufacturing method thereof, and a battery including the same.

2. Discussion of Related Art

Flexible electronic devices have attracted attention due to their convenience resulting from an excellent degree of freedom. The biggest obstacle to developing such flexible electronic devices is a power supply unit, and ion batteries are considered power sources for the flexible electronic devices because they have high energy density, high operating voltage, excellent cycle characteristics, and no memory effect.

Smart wearable devices are a generic term for high-tech wearable devices that can be used in smart wear, smart interiors, and the like. In particular, smart wear refers to a new concept of futuristic clothing that combines information technology (IT), nanotechnology (NT), biotechnology (BT), and environmental technology (ET), and is also called a "wearable computer" because the fiber or clothing itself can sense and respond to external stimuli. However, several challenges remain unresolved, including battery issues for continuous operation of the display and sensory components involved in smart wearable devices. Accordingly, there has been proposed a method of applying an ion battery to smart wearable devices. Conventional ion batteries are batteries having excellent properties such as high energy density, high stability, and a long lifespan cycle compared to other batteries. However, to be applied to smart wearable devices, the ion batteries need to be fabricated in the form of a one-dimensional fiber having excellent flexibility, and it is required to maintain excellent performance in the form of a fiber.

However, the conventional ion batteries have difficulty in application to wearable devices because the shape thereof is limited to a coin form, a cylindrical form, and a pouch form. Also, the low flash point of liquid electrolytes used in the ion batteries may cause stability problems when the batteries are placed near sensitive areas such as eyes and ears. Since such an ion battery includes metals such as an aluminum foil, a copper foil, and the like as a current collector of an electrode, it is easily cracked and is very hard. The current collector functions as the support layer of the electrode and simultaneously functions to allow current to flow. The electrode using a metal current collector is vulnerable to bending, and thus an active material may be easily detached, resulting in the loss of function as a battery. Therefore, batteries including such an electrode cannot be used as power sources for flexible electronic devices.

Accordingly, there has been proposed a method of fabricating an ion battery using a three-dimensional (3D) printing technology. The 3D printing technology is an additive manufacturing technology that is considered a future manufacturing technology with high efficiency and low cost, and particularly, extrusion-based 3D printing is being used in various fields including functional hydrogels for wound healing, 3D-scaffolds for cell growth, thermoelectricity, energy storage, and harvesting devices such as nanogenerators and supercapacitors. Therefore, there is a demand for the development of technology for fabrication of an ion battery that can be applied to smart wearable devices using the 3D printing technology. In addition, it is necessary to develop a technology capable of acting as an electrode without a conventional metal current collector, having sufficient mechanical properties and corrosion resistance to an electrolyte, and performing the role of an electrode even upon deformation.

SUMMARY OF THE INVENTION

The present invention has been made to solve the above-described problems of the related art, and one objective of the present invention is to provide an ion battery for a smart wearable devices whose electrochemical performance and flexibility are excellent.

Another objective of the present invention is to provide a method of manufacturing a self-standing electrode that is able to function without a metal current collector and a flexible battery including the self-standing electrode.

One aspect of the present invention provides a method of fabricating an ion battery for a smart wearable devices, which includes the steps of: (a) continuously press-printing each of a positive electrode ink composition and a negative electrode ink composition in a coagulation bath and drying the same to manufacture one or more electrode fibers; (b) twisting the electrode fibers to manufacture an electrode assembly; (c) coating the electrode assembly with a separator composition; and (d) placing one or more electrode assemblies in a heat shrinkable tube and introducing a gel electrolyte, wherein the electrode assemblies of the step (d) include at least one positive electrode assembly and at least one negative electrode assembly.

In an embodiment, the positive electrode ink composition may include a positive electrode active material, a binder, a conductive material, and a solvent, and the positive electrode active material may contain alkali metal-based oxide particles or alkaline earth metal-based oxide particles represented by the following Chemical Formula 1.

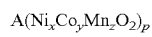 [Chemical Formula 1]

$A(Ni_xCo_yMn_zO_2)_p$

In Chemical Formula 1, A is Li, Na, or Mg, and p, x, y, and z are real numbers satisfying $0 \le p \le 2$, $0 \le x \le 1$, $0 \le y \le 1$, and $0 \le z \le 1$, respectively.

In an embodiment, the negative electrode ink composition may include a negative electrode active material, a binder, a conductive material, and a solvent, and the negative electrode active material may be one selected from the group consisting of natural graphite, Kish graphite, pyrolytic carbon, mesophase pitch-based carbon fiber, meso-carbon microbeads, mesophase pitches, petroleum-derived cokes, coal-derived cokes, silicon, silicon oxide, silicon-metal alloys, and a combination thereof.

In an embodiment, the binder may be one selected from the group consisting of polyvinylidene fluoride, polyvinyl fluoride, polyvinyl alcohol, carboxymethylcellulose, starch, hydroxypropylcellulose, polyvinylpyrrolidone, tetrafluoroethylene, polyethylene, polypropylene, ethylene-propylene rubber, styrene-butylene rubber, and a combination thereof.

In an embodiment, the conductive material may be one selected from the group consisting of natural graphite, artificial graphite, carbon black, acetylene black, Ketjen black, channel black, furnace black, lamp black, thermal black, carbon fibers, vapor grown carbon fibers (VGCFs), metal fibers, carbon fluoride, aluminum, nickel powder, zinc oxide, potassium titanate, titanium oxide, and a combination thereof.

In an embodiment, with respect to 100 parts by weight of the positive electrode active material, 10 to 50 parts by weight of the binder and 10 to 30 parts by weight of the conductive material may be included.

In an embodiment, with respect to 100 parts by weight of the negative electrode active material, 10 to 50 parts by weight of the binder and 10 to 30 parts by weight of the conductive material may be included.

In an embodiment, the electrode fiber may have a diameter of 100 to 400 μm.

In an embodiment, a printing pressure in the step (a) may range from 10 to 150 psi.

In an embodiment, a printing speed in the step (a) may range from 1 to 100 mm/s.

In an embodiment, the one or more electrode assemblies in the step (d) may be placed in the form of twisted yarn in a heat shrinkable tube.

Another aspect of the present invention provides an ion battery for a smart wearable device, which is fabricated by the above-described method of fabricating an ion battery for a smart wearable device.

Still another aspect of the present invention provides a smart wearable device including the above-described ion battery for a smart wearable device.

Yet another aspect of the present invention provides a method of manufacturing a self-standing electrode, which includes the steps of: (a) press-printing an ink composition on a glass substrate and drying the same; and (b) separating the resulting electrode from the substrate, wherein the ink composition includes a conductive carbon fiber, a polymer binder, and a solvent.

In an embodiment, the ink composition may further include at least one active material selected from the group consisting of natural graphite, Kish graphite, pyrolytic carbon, mesophase pitch-based carbon fiber, meso-carbon microbeads, mesophase pitches, petroleum-derived cokes, coal-derived cokes, silicon, silicon oxide, silicon-metal alloys, $LiMn_2O_4$, $LiFePO_4$, $LiNi_xCo_yMn_zO_2$, and $LiNi_xCo_yAl_zO_2$, and x, y, and z may satisfy $0 \le x \le 1$, $0 \le y \le 1$, and $0 \le z \le 1$, respectively.

In an embodiment, the polymer binder may be at least one selected from the group consisting of polyvinylidene fluoride, polyvinyl fluoride, polyvinyl alcohol, carboxymethylcellulose, starch, hydroxypropylcellulose, polyvinylpyrrolidone, tetrafluoroethylene, polyethylene, polypropylene, ethylene-propylene rubber, and styrene-butadiene rubber.

In an embodiment, the ink composition may have a solid content of 50 to 150 g/L.

In an embodiment, a weight ratio of the conductive carbon fiber and polymer binder in the ink composition may be 30 to 70:30 to 70.

In an embodiment, a weight ratio of the active material, conductive carbon fiber, and polymer binder in the ink composition may be 30 to 80:10 to 55:10 to 55.

In an embodiment, the pressure printing of the step (a) may be performed at a speed of 1 to 100 mm/s and a pressure of 10 to 150 psi.

Yet another aspect of the present invention provides a flexible battery including: a self-standing positive electrode in which an active material is loaded in a three-dimensional network structure including a conductive carbon fiber and a polymer binder; a self-standing negative electrode with a three-dimensional network structure including a conductive carbon fiber and a polymer binder; a separator interposed between the positive electrode and the negative electrode; and an electrolyte.

In an embodiment, the flexible battery may be charged and discharged while being bent 30° or more.

In an embodiment, at least one of the positive electrode and the negative electrode may have a capacity retention rate after 50 cycles of 75% or more.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
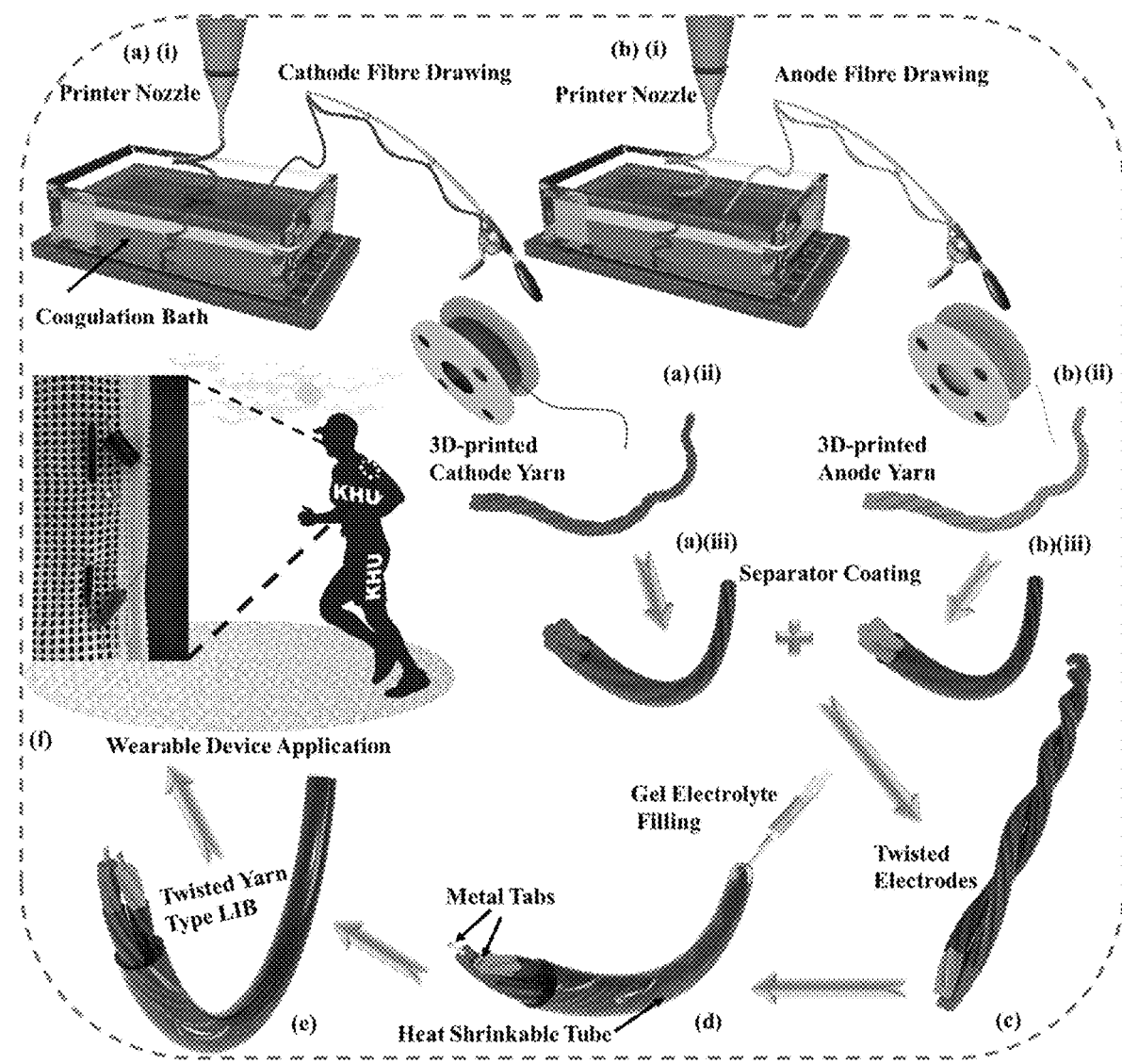
FIG. 1 shows schematic diagrams illustrating a method of fabricating an ion battery for a smart wearable device according to an embodiment of the present invention and an application example of a smart wearable device including the ion battery.

Hereinafter, aspects of the present invention will be described with reference to the accompanying drawings.

However, the present invention may have various embodiments and thus is not limited to the embodiments described herein. Also, in the drawings, descriptions of parts unrelated to the detailed description are omitted to clearly describe the aspects of the present invention. Throughout the specification, like numbers refer to like elements.

Throughout the specification, a certain part being "connected" to another part means that the certain part is "directly connected" to the other part or that the certain part is "indirectly connected" to the other part through another member interposed between the two parts. Also, a certain part "including" a certain element signifies that the certain part may further include, instead of excluding, another element unless specifically indicated otherwise.

When a numerical value is presented herein, the value has the precision of the significant digit provided in accordance with the standard rules in chemistry for significant digits unless its specific range is otherwise stated. For example, the numerical value 10 includes the range of 5.0 to 14.9, and the numerical value 10.0 includes the range of 9.50 to 10.49.

Hereinafter, embodiments of the present invention will be described in detail with reference to the accompanying drawings.

Method of Fabricating Ion Battery for Smart Wearable Device

FIG. 1 shows schematic diagrams illustrating a method of fabricating an ion battery for a smart wearable device according to an embodiment of the present invention and an application example of a smart wearable device including the ion battery.

Referring to FIG. 1, a method of fabricating an ion battery for a smart wearable device according to one aspect of the present invention includes the steps of: (a) continuously press-printing each of a positive electrode ink composition and a negative electrode ink composition in a coagulation bath and drying the same to manufacture one or more electrode fibers; (b) twisting the electrode fibers to manufacture an electrode assembly; (c) coating the electrode assembly with a separator composition; and (d) placing one or more electrode assemblies in a heat shrinkable tube and introducing a gel electrolyte, wherein the electrode assemblies of the step (d) include at least one positive electrode assembly and at least one negative electrode assembly.

In the step (a), a positive electrode ink composition or a negative electrode ink composition is continuously press-printed in a coagulation bath and then dried to manufacture an electrode in the form of a fiber. Using such an electrode fiber, a one-dimensional fiber-type battery having a different form factor from that of an existing ion battery with a two-dimensional planar structure may be fabricated.

The coagulation bath contains a liquid coagulant that coagulates the printed positive electrode ink composition or negative electrode ink composition when in contact with the same, and the liquid coagulant may include pure water, hexane, pentane, benzene, toluene, methanol, ethanol, a polyhydric alcohol such as glycerin, carbon tetrachloride, o-dichlorobenzene, polyethylene glycol, or the like, but the present invention is not limited thereto.

The positive electrode ink composition includes a positive electrode active material, a binder, a conductive material, and a solvent, and the positive electrode active material may contain alkali metal-based oxide particles or alkaline earth metal-based oxide particles represented by the following Chemical Formula 1.

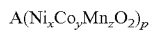   [Chemical Formula 1]

In Chemical Formula 1, A is Li, Na, or Mg, and p, x, y, and z are real numbers satisfying $0 \leq p \leq 2$, $0 \leq x \leq 1$, $0 \leq y \leq 1$, and $0 \leq z \leq 1$, respectively. For example, x, y, and z may each independently be 0, 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.00(y), or a value therebetween.

For example, the alkali metal-based oxide may be $LiNi_{0.6}Co_{0.2}Mn_{0.2}O_2$.

The positive electrode ink composition may have an apparent viscosity of 100 to 10,000 Pa·s at a shear rate of $10^{-3}$ s$^{-1}$, and the apparent viscosity may decrease as a shear rate increases. For example, the positive electrode ink composition may have an apparent viscosity of 100, 200, 300, 400, 500, 600, 700, or 800 Pas or more and 10,000, 9,000, 8,000, 7,000, 6,000, 5,000, 4,000, 3,000, 2,000, or 1,000 Pa·s or less at a shear rate of $10^{-3}$ s$^{-1}$. Also, the positive electrode ink composition may exhibit a viscoelastic gel shear thinning behavior.

The negative electrode ink composition includes a negative electrode active material, a binder, a conductive material, and a solvent, and the negative electrode active material may be one selected from the group consisting of natural graphite, Kish graphite, pyrolytic carbon, mesophase pitch-based carbon fiber, meso-carbon microbeads, mesophase pitches, petroleum-derived cokes, coal-derived cokes, silicon, silicon oxide, silicon-metal alloys, and a combination thereof.

The negative electrode active material may serve to emit electrons and receive alkali metal ions or alkaline earth metal ions during charging and receive electrons and send alkali metal ions or alkaline earth metal ions to a positive electrode during discharging. The natural graphite is in the form in which one alkali metal ion or one alkaline earth metal ion is inserted into a hexagonal ring with a layered structure and is a generally widely used negative electrode active material.

The negative electrode ink composition may have an apparent viscosity of 100 to 10,000 Pa·s at a shear rate of $10^{-3}$ s$^{-1}$, and the apparent viscosity may decrease as a shear rate increases. For example, the negative electrode ink composition may have an apparent viscosity of 100, 200, 300, 400, 500, 600, 700, or 800 Pas or more and 10,000, 9,000, 8,000, 7,000, 6,000, 5,000, or 4,000 Pa·s or less at a shear rate of $10^{-3}$ s$^{-1}$. Also, the negative electrode ink composition may exhibit a viscoelastic gel shear thinning behavior.

The binder may be one selected from the group consisting of polyvinylidene fluoride, polyvinyl fluoride, polyvinyl alcohol, carboxymethylcellulose, starch, hydroxypropylcellulose, polyvinylpyrrolidone, tetrafluoroethylene, polyethylene, polypropylene, ethylene-propylene rubber, styrene-butylene rubber, and a combination thereof.

The conductive material may be one selected from the group consisting of natural graphite, artificial graphite, carbon black, acetylene black, Ketjen black, channel black, furnace black, lamp black, thermal black, carbon fibers, vapor grown carbon fibers (VGCFs), metal fibers, carbon fluoride, aluminum, nickel powder, zinc oxide, potassium titanate, titanium oxide, and a combination thereof. The type of conductive material is not particularly limited as long as it does not cause a chemical change in a battery and has conductivity.

The VGCFs may be carbon materials in the form of a fiber prepared through chemical vapor deposition by exposing a gaseous compound containing carbon to a catalyst.

With respect to 100 parts by weight of the positive electrode active material, 10 to 50 parts by weight of the binder and 10 to 30 parts by weight of the conductive material may be included. For example, the content of the binder may be 10, 15, 20, 25, 30, 35, 40, 45, 50 parts by weight, or a value therebetween, and the content of the conductive material may be 10, 15, 20, 25, 30 parts by weight, or a value therebetween.

With respect to 100 parts by weight of the negative electrode active material, 10 to 50 parts by weight of the binder and 10 to 30 parts by weight of the conductive material may be included. For example, the content of the binder may be 10, 15, 20, 25, 30, 35, 40, 45, 50 parts by weight, or a value therebetween, and the content of the conductive material may be 10, 15, 20, 25, 30 parts by weight, or a value therebetween.

The rheological properties of the ink composition play an important role in printing. Therefore, to maintain the performance of the conventional ion battery, it is necessary to fine-tune the properties of the ink composition. The ink composition may consist of an active material, a conductive material, a binder, and a solvent for homogeneously dispersing the same. Since different particles having a wide particle size range, which are included in the ink composition, may cause nozzle clogging when agglomerated, it is preferable to minimize agglomeration by increasing the homogeneity of the particles. Also, the amount of the solvent included in the ink composition needs to be optimized to implement a continuous ink flow during printing and enhance stability after printing without amalgamation of printed layers.

The electrode fiber may have a diameter of 100 to 400 µm. In this case, the diameter of the electrode fiber may be 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, or a value therebetween and 400 µm or less, 390 µm or less, or 380 µm or less. When the diameter of the electrode fiber is less than 100 µm, the durability of the electrode fiber may be degraded, and when the diameter of the electrode fiber exceeds 400 µm, flexibility may be degraded.

The pressure printing is a 3D printing technology in which an ink is injected through a nozzle while being pressurized, and due to using the nozzle, a 3D structure manufactured through pressure printing may be affected by the density, viscosity, and the like of the used ink. In an embodiment, the pressure printing may utilize a direct ink writing (DIW) method in which a liquid or molten ink is stacked and solidified as it is.

In the step (a), a printing pressure may range from 10 to 150 psi. For example, the printing pressure may be 10 psi, 15 psi, 20 psi, 25 psi, 30 psi, 35 psi, 40 psi, 45 psi, 50 psi, 55 psi, 60 psi, 65 psi, 70 psi, 75 psi, 80 psi, 85 psi, 90 psi, 95 psi, 100 psi, 105 psi, 110 psi, 115 psi, 120 psi, 125 psi, 130 psi, 135 psi, 140 psi, 145 psi, 150 psi, or a value between two thereof. When the printing pressure is less than 10 psi, printability may be degraded, and when the printing pressure exceeds 150 psi, the cracks and defects of the electrode fiber may be generated.

In addition, in the step (a), a printing speed may range from 1 to 100 mm/s. For example, the printing speed may be 1 mm/s, 5 mm/s, 10 mm/s, 15 mm/s, 20 mm/s, 25 mm/s, 30 mm/s, 35 mm/s, 40 mm/s, 45 mm/s, 50 mm/s, 55 mm/s, 60 mm/s, 65 mm/s, 70 mm/s, 75 mm/s, 80 mm/s, 85 mm/s, 90 mm/s, 95 mm/s, 100 mm/s, or a value between two thereof. When the printing speed is less than 1 mm/s, printability may be degraded, and when the printing speed exceeds 100 mm/s, the cracks and defects of the electrode fiber may be generated.

In the step (b), the one or more electrode fibers manufactured in the step (a) are twisted to manufacture an electrode assembly in the form of twisted yarn, and the electrode assembly in the form of twisted yarn may exhibit excellent flexibility and excellent durability compared to the electrode fiber to enhance the durability of an ion battery including the electrode assembly. Also, various thicknesses of the electrode assemblies and ion batteries including the electrode assemblies may be manufactured by adjusting the number of electrode fibers included in the electrode assembly.

The electrode assembly may further include a metal tab for connection to an external device.

In the step (c), the electrode assembly manufactured in the step (b) is coated with a separator composition by a brushing, spraying, or immersing method. Since a separator composition is directly applied to the electrode assembly, an ion battery having excellent flexibility compared to that using a conventional separator manufactured in the form of a sheet may be fabricated.

In the step (d), the one or more separator-coated electrode assemblies manufactured in the step (c) and a gel electrolyte are introduced into a heat shrinkable tube, and the one or more electrode assemblies may be placed in the heat shrinkable tube to fabricate various thicknesses of ion batteries in the form of a one-dimensional fiber. Also, the step (d) may further include sealing the heat shrinkable tube after the introduction of the gel electrolyte, and the sealing may prevent the electrolyte from leaking out.

In the step (d), the one or more electrode assemblies may be placed in a parallel structure, a twisted yarn structure, a coaxial structure, or the like in the heat shrinkable tube. In an embodiment, since the one or more electrode assemblies are placed in the form of twisted yarn in the heat shrinkable tube, they may be woven together with a typical wearable device due to having a form similar to a typical wearable device or with other types of smart wearable device, and a smart wearable device having excellent flexibility may be manufactured.

In the step (d), the gel electrolyte may include an alkali metal salt or alkaline earth metal salt and a solvent and optionally further include an additive. The solvent of the electrolyte may be an aqueous or non-aqueous solvent, but the present invention is not limited thereto. The additive may be fluoroethylene carbonate, tert-difluoroethylene carbonate, vinyl carbonate, ethylene sulfite, or the like, but the present invention is not limited thereto.

The alkali metal salt may be $LiCl$, $LiBr$, $LiI$, $LiClO_4$, $LiBF_4$, $LiBioClio$, $LiPF_6$, $LiCF_3SO_3$, $LiCF_3CO_2$, $LiAsF_6$, $SiSbF_6$, $SiAlCl_4$, $CH_3SO_3Li$, $(CF_3SO_2)_2NLi$, chloroborane lithium, lower aliphatic lithium carboxylates, lithium tetraphenylborate, imides, $NaCl$, $NaBr$, $NaI$, $NaClO_4$, $NaBF_4$, $NaB_{10}Cl_{10}$, $NaPF_6$, $NaCF_3SO_3$, $NaCF_3CO_2$, $NaAsF_6$, $SiSbF_6$, $SiAlCl_4$, $CH_3SO_3Na$, $(CF_3SO_2)_2NNa$, chloroborane sodium, lower aliphatic sodium carboxylates, sodium tetraphenylborate, or a mixture of at least two thereof, but the present invention is not limited thereto.

The solvent may be a non-aqueous organic solvent, and the non-aqueous organic solvent may be N-methyl-2-pyrrolidone, propylene carbonate, ethylene carbonate, diethylene carbonate, butylene carbonate, dimethyl carbonate, diethyl carbonate, γ-butyrolactone, 1,2-dimethoxyethane, 2-methyltetrahydrofuran, dimethyl sulfoxide, 1,3-dioxolane, formamide, dimethylformamide, dioxolane, acetonitrile, nitromethane, methyl formate, methyl acetate, triester phosphate, trimethoxy methane, dioxolane derivatives, sulfolane, methylsulfolane, 1,3-dimethyl-2-imidazolidinone, propylene carbonate derivatives, tetrahydrofuran derivatives, ethers, methyl propionate, ethyl propionate, or a mixture of at least two thereof, but the present invention is not limited thereto.

Ion Battery for Smart Wearable Device

An ion battery for a smart wearable device according to another aspect of the present invention may be fabricated by the above-described method of fabricating an ion battery for a smart wearable device.

The ion battery for a smart wearable device may exhibit a specific discharge capacity of 100 to 300 mAh $g^{-1}$ at a voltage ranging from 2.7 to 4.3 V and a current density of 0.1 C and a capacity retention rate after 30 cycles of 90% or more. For example, the ion battery for a smart wearable device may exhibit a specific discharge capacity of 100 mAh $g^{-1}$ or more, 110 mAh or more, 120 mAh $g^{-1}$ or more, 130 mAh $g^{-1}$ or more, 140 mAh $g^{-1}$ or more, or 150 mAh $g^{-1}$ or more and 300 mAh $g^{-1}$ or less at a voltage ranging from 2.7 to 4.3 V and a current density of 0.1 C.

The ion battery for a smart wearable device may maintain electrochemical performance as an ion battery while being bent 30° or more, 60° or more, 90° or more, 120° or more, or 150° or more or while being bent 180° (that is, being completely folded) and also maintain electrochemical performance as an ion battery in a state where there are one or more bent points, and thus a smart wearable device whose durability and flexibility are excellent may be manufactured using the ion battery for a smart wearable device.

The ion battery for a smart wearable device may be fabricated to have a low thickness or a small volume due to not including a metal current collector or other skeletal materials and may be applied to not only a smart wearable device but also various smart wearable electronic devices due to having excellent flexibility and not corroding. In an embodiment, the conductive material included in the positive electrode and negative electrode ink compositions may be used as a conductive matrix replacing a current collector or a skeletal material. For example, the conductive material included in the positive electrode and negative electrode ink compositions may be VGCFs.

A smart wearable device according to still another aspect of the present invention may include the electrode fiber manufactured in the step (a) of the method of fabricating an ion battery for a smart wearable device or the electrode assembly manufactured in the step (b).

The smart wearable device according to still another aspect of the present invention may include the above-described ion battery for a smart wearable device.

Self-Standing Electrode and Manufacturing Method Thereof

As used herein, a "self-standing electrode" means an electrode capable of maintaining its shape without a separate current collector and transferring current between active materials unlike a conventional electrode manufactured by including copper, aluminum, and the like as a substrate and a current collector and applying an active material-containing slurry onto at least one surface thereof.

The self-standing electrode may have a three-dimensional network structure including a conductive carbon fiber and a polymer binder. The conductive carbon fiber may serve to maintain the shape of the electrode and simultaneously serve as a conductive material that transmits current. Also, the conductive carbon fiber may serve as an active material that stores lithium, sodium, magnesium, and the like and may be, for example, VGCFs, but the present invention is not limited thereto. The VGCFs have a graphite structure in the form of a coil and thus may serve as a negative electrode active material that has conductivity and stores ions.

The polymer binder may form a three-dimensional network structure by bonding to the conductive carbon fiber. The polymer binder may be at least one selected from the group consisting of polyvinylidene fluoride, polyvinyl fluoride, polyvinyl alcohol, carboxymethylcellulose, starch, hydroxypropylcellulose, polyvinylpyrrolidone, tetrafluoroethylene, polyethylene, polypropylene, ethylene-propylene rubber, and styrene-butadiene rubber, but the present invention is not limited thereto.

The self-standing electrode may further include an active material. For example, the self-standing electrode may include at least two types of active materials. When the active material is loaded in the three-dimensional network structure, properties as an electrode may be improved. Examples of the active material include: a negative electrode active material such as natural graphite, Kish graphite, pyrolytic carbon, mesophase pitch-based carbon fiber, mesocarbon microbeads, mesophase pitches, petroleum-derived cokes, coal-derived cokes, silicon, silicon oxide, or silicon-metal alloys; a positive electrode active material such as $LiMn_2O_4$, $LiFePO_4$, $LiNi_xCo_yMn_zO_2$, or $LiNi_xCo_yAl_zO_2$ (satisfying $0 \leq x \leq 1$, $0 \leq y \leq 1$, and $0 \leq z \leq 1$); and the above-described positive electrode active material, but the present invention is not limited thereto.

A method of manufacturing a self-standing electrode according to yet another aspect of the present invention includes the steps of: (a) press-printing an ink composition on a glass substrate and drying the same; and (b) separating the resulting electrode from the substrate, wherein the ink composition includes a conductive carbon fiber, a polymer binder, and a solvent.

In the step (a), the ink composition is press-printed on a glass substrate and dried to form a three-dimensional network structure. The drying may be intended to obtain only a three-dimensional network structure by drying an unnecessary solvent included in the ink composition.

In the step (b), the resulting self-standing electrode with a three-dimensional network structure is separated from the substrate. When the glass substrate and the polymer binder in the ink composition have mutually repelling properties (e.g., hydrophilicity and hydrophobicity), the separation may be further facilitated.

The ink composition includes a conductive carbon fiber and a polymer binder as described above. As an example, the ink composition may further include at least one selected from the above-described active materials.

The ink composition may be a suspension or slurry in which the conductive carbon fiber, the polymer binder, and an optional active material are dissolved in a solvent, and the solvent may be at least one selected from dimethylacetamide (DMAc), dimethylformamide (DMF), dimethyl sulfoxide (DMSO), and N-methyl pyrrolidone (NMP), but the present invention is not limited thereto.

The ink composition may have a solid content of 50 to 150 g/L, for example, 50 g/L, 55 g/L, 60 g/L, 65 g/L, 70 g/L, 75 g/L, 80 g/L, 85 g/L, 90 g/L, 95 g/L, 100 g/L, 105 g/L, 110 g/L, 115 g/L, 120 g/L, 125 g/L, 130 g/L, 135 g/L, 140 g/L, 145 g/L, 150 g/L, or a value between two thereof. When the solid content is outside the above-described range, the viscosity of the ink composition is not suitable for pressure printing, and thus the printed material may not have a three-dimensional network structure, or a nozzle may be clogged during printing.

In the ink composition, a weight ratio of the conductive carbon fiber and the polymer binder may be 30 to 70:30 to 70. For example, the proportion of the conductive carbon fiber may be 30, 35, 40, 45, 50, 55, 60, 65, 70, or a value therebetween, and the proportion of the polymer binder may be 30, 35, 40, 45, 50, 55, 60, 65, 70, or a value therebetween. The sum of the proportions thereof may be 100, but the present invention is not limited thereto. When the proportion of the polymer binder in the ink composition is excessively high, the polymer may be filled in the conductive carbon fiber, and thus the pathway for ion migration may be blocked, and when the proportion of the polymer binder in the ink composition is excessively low, a three-dimensional network structure may easily collapse.

In the ink composition, a weight ratio of the active material, the conductive carbon fiber, and the polymer binder may be 30 to 80:10 to 55:10 to 55. For example, the proportion of the active material may be 30, 35, 40, 45, 50, 55, 60, 65, 70, 75, 80, or a value therebetween, the proportion of the conductive carbon fiber may be 10, 15, 20, 25, 30, 35, 40, 45, 50, 55, or a value therebetween, and the proportion of the polymer binder may be 10, 15, 20, 25, 30, 35, 40, 45, 50, 55, or a value therebetween. The sum of the proportions thereof may be 100, but the present invention is not limited thereto. When the proportion of the active material is excessively high, a three-dimensional network structure may easily collapse, or the pathway for ion migration may be blocked, and when the proportion of the active material is excessively low, a space for ion storage may be insufficient.

The pressure printing of the step (a) may be performed at a speed of 1 to 100 mm/s and a pressure of 10 to 150 psi. For example, the pressure printing may be performed at a speed of 1 mm/s, 5 mm/s, 10 mm/s, 15 mm/s, 20 mm/s, 25 mm/s, 30 mm/s, 35 mm/s, 40 mm/s, 45 mm/s, 50 mm/s, 55 mm/s, 60 mm/s, 65 mm/s, 70 mm/s, 75 mm/s, 80 mm/s, 85 mm/s, 90 mm/s, 95 mm/s, 100 mm/s, or a value between two thereof and a pressure of 10 psi, 15 psi, 20 psi, 25 psi, 30 psi, 35 psi, 40 psi, 45 psi, 50 psi, 55 psi, 60 psi, 65 psi, 70 psi, 75 psi, 80 psi, 85 psi, 90 psi, 95 psi, 100 psi, 105 psi, 110 psi, 115 psi, 120 psi, 125 psi, 130 psi, 135 psi, 140 psi, 145 psi, 150 psi, or a value between two thereof. When the printing speed is outside the above-described range, it may take an excessive amount of time for the manufacture of an electrode, or the uniformity of the manufactured electrode may be degraded. When the printing pressure is outside the above-described range, printing may be impossible, or the formation of a three-dimensional network structure may be difficult.

Flexible Battery

A flexible battery according to yet another aspect of the present invention includes: a self-standing positive electrode in which an active material is loaded in a three-dimensional network structure including a conductive carbon fiber and a polymer binder; a self-standing negative electrode with a three-dimensional network structure including a conductive carbon fiber and a polymer binder; a separator interposed between the positive electrode and the negative electrode; and an electrolyte.

The descriptions about the self-standing positive electrode and the self-standing negative electrode are the same as those described for the above-described self-standing electrode.

The separator may be at least one single membrane or composite membrane selected from a polyethylene-based separator, a polypropylene-based separator, a polyethylene terephthalate-based separator, and a polyvinylidene fluoride-based separator, but the present invention is not limited thereto. The separator is formed of a polymer and thus may have flexibility.

The electrolyte may contain at least one solvent selected from the group consisting of ethylene carbonate, propylene carbonate, butylene carbonate, vinylene carbonate, dimethyl carbonate, methyl ethyl carbonate, diethyl carbonate, methyl acetate, ethyl acetate, propyl acetate, methyl propionate, ethyl propionate, γ-butyrolactone, 1,2-dimethoxyethane, 1,2-diethoxyethane, tetrahydrofuran, 1,2-dioxane, 2-methyltetrahydrofuran, dioxolane, acetonitrile, and dimethylformamide and at least one salt selected from the group consisting of $LiPF_6$, $LiBF_4$, $LiClO_4$, $Li(CF_3SO_2)_2$, $LiCF_3SO_3$, $LiSbF_6$, $LiAsF_6$, $LiNO_3$, and LiTFSI, but the present invention is not limited thereto.

The flexible battery may be charged and discharged while being bent 30° or more, for example, 30°, 35°, 40°, 45°, 50°, 55°, 60°, 65°, 70°, 75°, 80°, 85°, 90°, 95°, or 100°, from its fabricated form. For example, a state in which a flat battery is folded in half may be a bent state of 180°. Since the flexible battery does not include a metal current collector whose bending and stretching are impossible, it may have flexibility. Also, since the self-standing electrode is capable of maintaining electrochemical properties even in a bent state while having sufficient mechanical properties, charging and discharging may be possible even in a bent state.

At least one of the positive electrode and the negative electrode may have a capacity retention rate after 50 cycles of 75% or more. The flexible battery may be applied in various fields by including the self-standing electrode having an excellent capacity retention rate.

Hereinafter, exemplary embodiments of the present invention will be described in more detail. However, hereinafter, only experimental results obtained from a few selected exemplary embodiments of the invention will be described, and the scope and contents of the invention should not be interpreted as being reduced or limited by the few selected exemplary embodiments. The effects of each of the various embodiments of the invention which are not explicitly set forth below will be described in detail in relevant sections. The experimental results below were obtained at room temperature (25° C.) and atmospheric pressure (1 atm) unless otherwise specified. For example, the viscosity of each component was measured at room temperature and atmospheric pressure.

Samples and Analytical Instruments

Commercially available NCM 622 ($LiNi_{0.6}Co_{0.2}Mn_{0.2}O_2$, 3 to 8 μm, L&F) and natural graphite (BTR New Energy Materials) were used as electrode active materials. Vapor grown carbon fibers (VGCFs, Showa Denko) as a conductive material and polyvinylidene fluoride (PVdF, $M_w$: about 600,000, Solvay Chemicals) as a polymer binder were used, and N-methyl-2-pyrrolidone (NMP, 99.5%, Daejung Chemical and Metals) was used as a solvent. Poly(vinylidene fluoride-co-hexafluoropropylene) (PVdF-co-HFP, $M_w$: about 400,000, Sigma Aldrich) and carboxymethyl cellulose (CMC, $M_w$: about 90,000, Sigma Aldrich) were used to prepare a separator.

Commercially available NCA ($LiNi_{0.8}Co_{0.15}Al_{0.05}O_2$, 3 to 8 μm) was purchased from EcoPro BM and used as a positive electrode active material. Vapor grown carbon fibers (VGCFs) were purchased from Showa Denko and used as a negative electrode active material and a conductive material. Polyvinylidene fluoride (PVdF, $M_w$: 602,000) was purchased from Solvay Chemicals and used as a binder.

N-methyl-2-pyrrolidone (NMP, 99.5%) was purchased from Daejung Chemical and Metals and used as a solvent for preparing an electrode slurry.

Microstructure images and sample morphologies were analyzed using a high-resolution field emission scanning electron microscope (HR FE-SEM, Merlin, Carl Zeiss), and the elemental composition of a sample was confirmed using an energy-dispersive X-ray spectrometer (EDS, Oxford Instruments). Electrical conductivity was measured using an LCR meter (HP 4263B, Hewlett Packard), and the rheological properties of an electrode ink composition were confirmed using a controlled stress rheometer (VT 550, Thermo Electron GmbH, Haake Mars). Apparent viscosities were measured at varying shear rates by loading an ink at an interval of 0.95 mm between two parallel steel plates having a diameter of 20 mm and then operating a rotational ramp at 25° C.

Crystalline properties and phase purity were confirmed by Cu-Kα radiation (60 kV, 55 mA, λ=1.54 Å) using an X-ray diffractometer (XRD, M18XHF-SRA, Mac Science).

The vibration dynamics of a carbon sample, such as low frequency vibration and rotation mode, were confirmed using a high-resolution Raman spectrometer (inVia™, Renishaw) equipped with an Ar ion laser (50 mW @514 nm).

The electrical conductivity of a sample was measured using a four-point probe (MCP T610, Mitsubishi). A sample cut into a thickness of 60 μm, a width of 2 cm, and a length of 2 cm was measured three times at varying points to obtain uniform reading values.

A tensile test was performed at 25° C. and a rate of 2 mm/min using a universal testing machine (UTM, 5844, Instron). In the tensile test, a sample cut into a thickness of 60 μm, a width of 2 cm, and a length of 6 cm was used.

Preparation Example 1-1: Electrode Fiber

NCM 622, VGCFs, and PVdF in a weight ratio shown in Table 1 were dissolved in NMP to prepare a positive electrode ink composition. Specifically, PVdF was completely dissolved in 2.5 ml of an NMP solvent, VGCFs and NCM 622 were sequentially added, and the resultant was homogenized in a fume hood for 30 minutes to prepare a positive electrode ink composition. The positive electrode ink composition was injected into a 10 ml syringe barrel, and the syringe barrel was closed with a cartridge piston suitable for printing. A negative electrode ink composition was prepared with a similar method to that for the positive electrode ink composition, except that natural graphite (Graphite) was used as an active material instead of NCM 622. In order to obtain a viscosity suitable for DIW-based 3D printing, the solid loading ratio of the positive electrode ink composition and the negative electrode ink composition was set to be 400 mg/ml.

3D printing of an electrode fiber was performed using a multi-screw printing/dispensing system (Nordson EFD) having 3D programming (Teach Motion) software. The cartridge filled with the ink composition was mounted on a fluid body seat assembly equipped with an expanded 27 GA smooth flow tapered nozzle tip, and the syringe barrel was pressurized using a CCNT-25S Pro compressor. The positive electrode ink composition and the negative electrode ink composition were maintained at a pressure of 30 psi, and a printing speed was set to be 5 mm/s to obtain a continuous electrode fiber. The nozzle tip was immersed in an ethanol-containing coagulation bath to allow the electrode ink composition to be in contact with the ethanol solution, and when a fibrous gel containing micro and nanoparticles wrapped by PVdF was formed, to obtain sufficient rigidity, the printed fiber was immersed in a coagulation bath for a minute to remove the NMP solvent and then dried at room temperature. Afterward, the electrode fibers were twisted to manufacture an electrode assembly in the form of twisted yarn.

TABLE 1

| Classification | Composition | Ratio | σ (S cm$^{-1}$) | Discharge capacity @ 0.1 C. (mAh g$^{-1}$) |
|---|---|---|---|---|
| CF-424 | NCM:VGCF:PVdF | 40:20:40 | 5.57 | 160 |
| CF-523 | NCM:VGCF:PVdF | 50:20:30 | 7.18 | 164 |
| CF-622 | NCM:VGCF:PVdF | 60:20:20 | 7.96 | 180 |
| AF-424 | Graphite:VGCF:PVdF | 40:20:40 | 5.38 | 292 |
| AF-523 | Graphite:VGCF:PVdF | 50:20:30 | 8.12 | 323 |
| AF-622 | Graphite:VGCF:PVdF | 60:20:20 | 8.77 | 320 |

Preparation Example 1-2: Separator Composition and Gel Electrolyte 10 wt % of PVDF-co-HFP was dissolved in acetone, and constant stirring was performed at 25° C. and 300 rpm for 3 hours to prepare a separator composition.

A gel electrolyte solution was prepared by mixing PVdF-co-HFP and CMC in a DMSO solvent in a weight ratio of 17.5:7.5:75. The mixed solution was completely homogenized, then a liquid electrolyte obtained by mixing ethylene carbonate (EC) and diethylene carbonate (DEC) in a volume ratio of 1:1 and injecting 1.0 M lithium hexafluorophosphate (LiPF$_6$) thereinto was added in an amount of 600 wt % relative to the polymer weight, and the resultant was completely mixed at 500 rpm for 30 minutes to obtain a reversible thixotropic gel electrolyte.

Experimental Example 1-1: Analysis of Rheological Properties of Ink Composition

Figure 2:
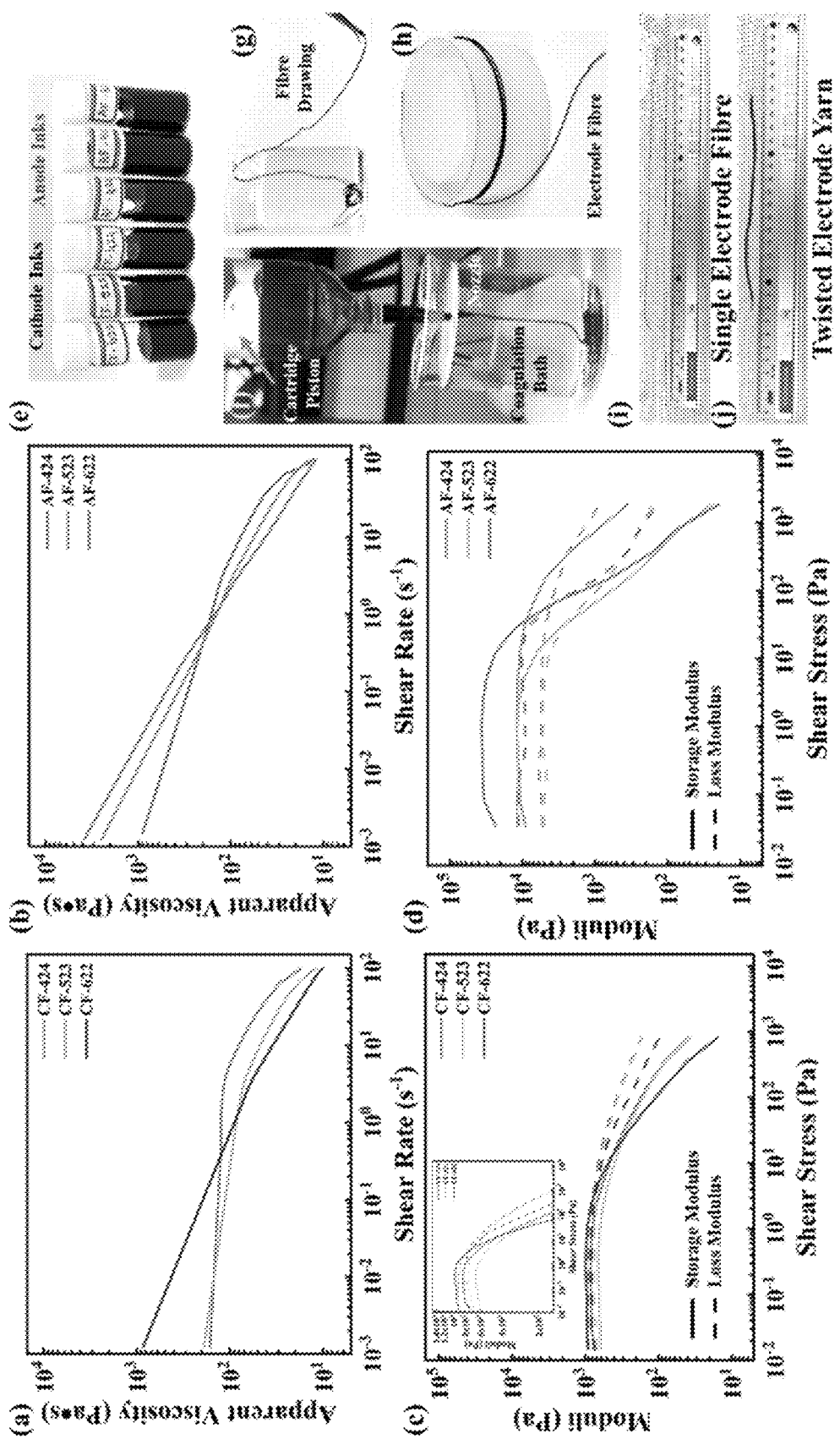
FIG. 2 shows the results of analyzing the rheological behavior of an electrode ink composition according to an embodiment of the present invention.

FIG. 2 shows the results of analyzing the rheological behavior of the electrode ink composition according to an embodiment of the present invention.

Specifically, an experiment using the electrode ink composition was performed on a 20 mm iron plate, which was set at 25° C. and provided with a solvent trap that prevents solvent evaporation, and for each sample, the electrode ink composition was loaded onto the iron plate at a regular interval of 1 mm between parallel plates. In order to analyze the behavior of apparent viscosity according to an increase in shear rate, a rotational ramp test was performed at a shear rate ranging from $10^{-3}$ to $10^2$ s$^{-1}$. In addition, to measure the storage (G') and loss (G") moduli of the positive electrode and negative electrode ink compositions according to a change in shear stress, an oscillatory amplitude sweep test was performed at a shear stress ranging from $10^{-2}$ to $10^3$ Pa. In this case, a frequency was set to 1 Hz.

Referring to FIG. 2A, all three positive electrode ink compositions exhibited decreased apparent viscosities as a shear rate increased. Particularly, CF-622 exhibited the highest apparent viscosity of 854 Pa·s at a shear rate of $10^{-3}$ s$^{-1}$ and thus clearly showed a viscoelastic gel shear thinning behavior. Conversely, CF-523 and CF-424 exhibited apparent viscosities of 190 and 163 Pa·s, respectively, at a shear rate of $10^{-3}$ s$^{-1}$, and the apparent viscosities constantly or minimally decreased at low shear rates and rapidly decreased at high shear rates, thereby showing a viscoelastic liquid shear thinning behavior.

Referring to FIG. 2B, all of the negative electrode ink compositions exhibited apparent viscosities about 10 times higher than those of the positive electrode ink compositions at the same shear rate. AF-622 exhibited an apparent viscosity of 3,800 Pa·s at a shear rate of $10^{-3}$ s$^{-1}$ and this apparent viscosity was higher than the apparent viscosities of AF-523 and AF-424 (i.e., 2488 and 896 Pa·s, respectively) at the same shear rate. All of the negative electrode ink compositions exhibited significantly decreased apparent viscosities as a shear rate increased and thus showed a viscoelastic gel shear thinning behavior.

As a result of the rotational ramp test, it can be seen that all of the positive electrode and negative electrode ink compositions are suitable for DIW-based 3D printing, and as the concentration of an active material in the positive electrode and negative electrode ink compositions increases, apparent viscosity increases.

Referring to FIG. 2C, the elastic or solid-like (G') behavior and viscous or liquid-like (G") behavior of the positive electrode ink compositions according to a change in shear stress can be confirmed. All of the positive electrode ink compositions exhibited storage modulus and loss modulus values close to $10^3$ Pa in the low shear stress section, and the difference between storage modulus and loss modulus was very small. CF-523 and CF-424 exhibited loss moduli higher than storage moduli (G">G') in all shear stress sections and thus showed a liquid-like behavior. It can be seen from the result that the two ink compositions are easily discharged through the nozzle even with a small force and have low leveling resistance. On the other hand, the oscillatory amplitude sweep of CF-622 showed a markedly contrasting behavior in three distinct regions of the curve. In the low shear stress section, storage modulus was higher than loss modulus (G'>G"), and thus a solid-like or elastic behavior was shown, and it can be seen from the result that it is possible to maintain the structural integrity of the printed pattern due to high leveling resistance. Also, as shear stress increased, storage and viscosity moduli intersected at a specific point to form a yield point indicating the start of elastic deformation, and in the high shear stress section, loss modulus was higher than storage modulus (G">G'), and thus the transition to a liquid-like or viscous behavior necessary for the smooth flow of the ink composition through the nozzle was observed.

Referring to FIG. 2D, the oscillatory amplitude sweep of the negative electrode ink compositions according to a change in shear stress can be confirmed. In the low shear stress section, a storage modulus plateau (stable state) of about $10^4$ Pa and a loss modulus plateau slightly lower than $10^4$ Pa were observed, and all of the negative electrode ink compositions exhibited storage and loss moduli about 10 times higher than those of the positive electrode ink compositions. Similarly to CF-622, the negative electrode ink compositions exhibited G'>G" in the lower shear stress section and G">G' in the higher shear stress section than the yield point at which storage and viscosity moduli intersected. It can be seen from the result that they are suitable as inks for 3D printing.

FIG. 2E shows a photograph of positive electrode and negative electrode ink compositions used to print the electrode fiber of the experimental example.

FIG. 2F shows a photograph illustrating a process of manufacturing an electrode fiber through DIW-based 3D printing. The manufactured electrode fiber was obtained using tweezers as shown in FIG. 2G, wound around a cylindrical spindle as shown in FIG. 2H, and dried at room temperature for several minutes.

FIG. 2I shows a photograph of a dried single electrode fiber with a length of 55 cm, indicating that the electrode fiber can be easily mass-produced through a DIW-based 3D printing technology.

FIG. 2J a photograph of an electrode assembly in the form of twisted yarn manufactured by twisting a plurality of electrode fibers in an axial direction.

Experimental Example 1-2: Analysis of Structural Morphology of Electrode Fiber

Figure 3:
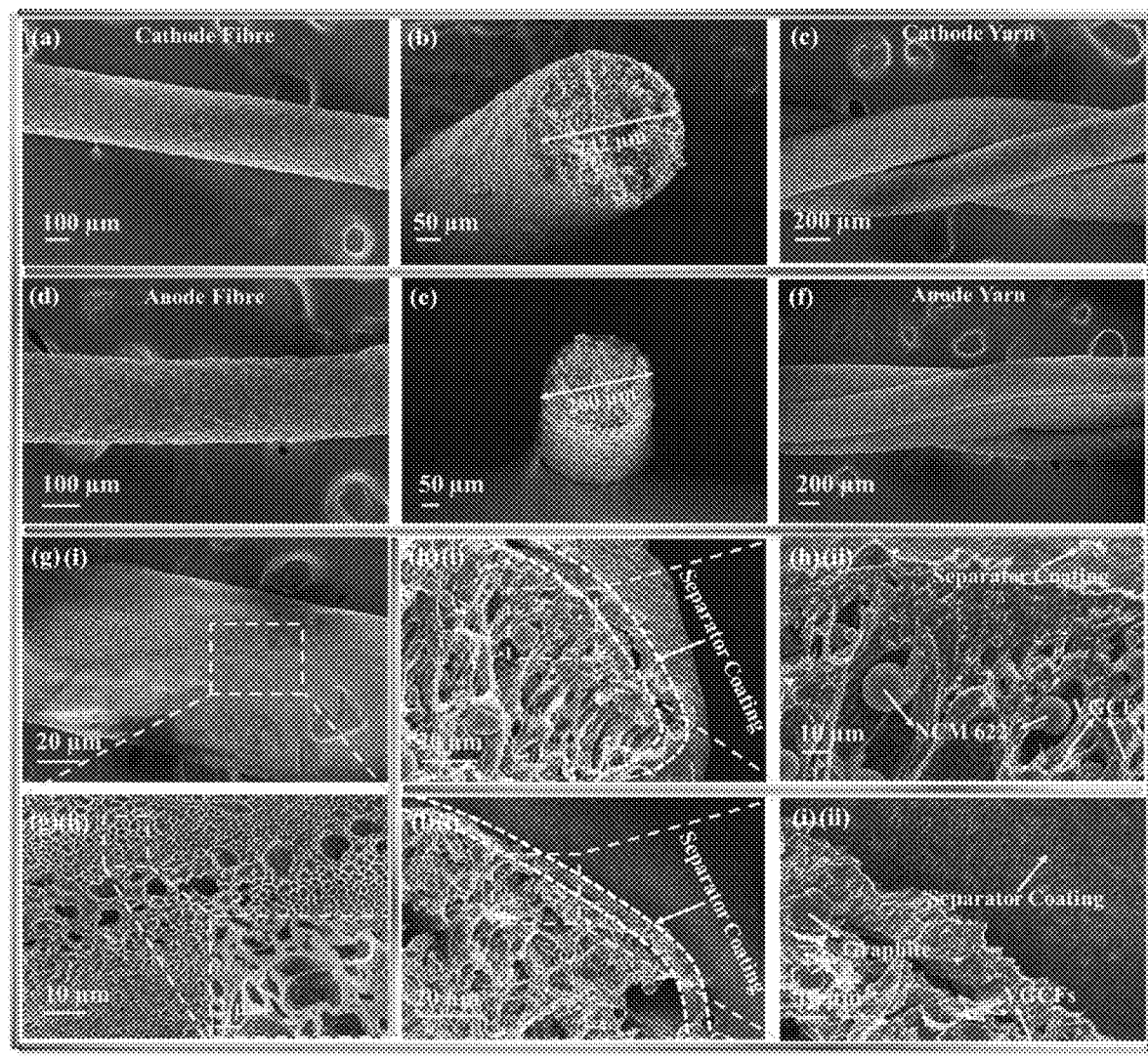
FIG. 3 shows the HR FE-SEM images of a printed electrode fiber and an electrode assembly in the form of twisted yarn according to an embodiment of the present invention.

FIG. 3 shows the results of imaging the microstructure of the printed electrode fiber and the electrode assembly in the form of twisted yarn using HR FE-SEM and analyzing the morphological characteristics thereof.

FIGS. 3A and 3D show the HR FE-SEM images of the printed positive electrode and negative electrode fibers, and a uniform tubular structure was shown along an axial direction. FIGS. 3B and 3E show the cross-sectional images of the positive electrode and negative electrode fibers, a dense morphology without macroscopic voids was shown, and the positive electrode and negative electrode fibers was confirmed as having diameters of 242 μm and 260 μm, respectively. Due to the surface tension between the NMP solvent and the coagulation bath, the overall surface was rough and porous. When the electrode ink composition was in contact with the coagulation bath, the NMP solvent of the electrode ink composition had a higher concentration than the coagulation bath, and the printed electrode fiber was rapidly coagulated as the NMP solvent moved from the electrode surface to the coagulation bath due to the concentration gradient. In this process, a number of microchannels were formed in the electrode structure to enhance electrolyte absorption and an ion transport pathway.

FIGS. 3C and 3F show the HR FE-SEM images of positive electrode and negative electrode assemblies in the form of twisted yarn manufactured by twisting the printed electrode fibers.

The electrode assembly in the form of twisted yarn was immersed in a PVdF-HFP polymer-containing solution to form a separator coating as shown in FIG. 3G(i), and it was confirmed that the surface was porous as shown in FIG. 3G(ii).

FIGS. 3H(i), 3H(ii), 3I(i), and 3I(ii) show the cross-sectional images of regions of the positive electrode and negative electrode assemblies in the form of twisted yarn in contact with the PVdF-HFP separator. Since the applied PVdF-HFP separator has a thickness of 6 to 12 μm, it physically prevents the formation of a short circuit between the positive electrode yarn and negative electrode yarn to allow the positive electrode yarn and negative electrode yarn to be easily twisted in an axial direction, and the electrode yarn and the separator are compatible to promote electrolyte permeability and absorption.

Figure 4:
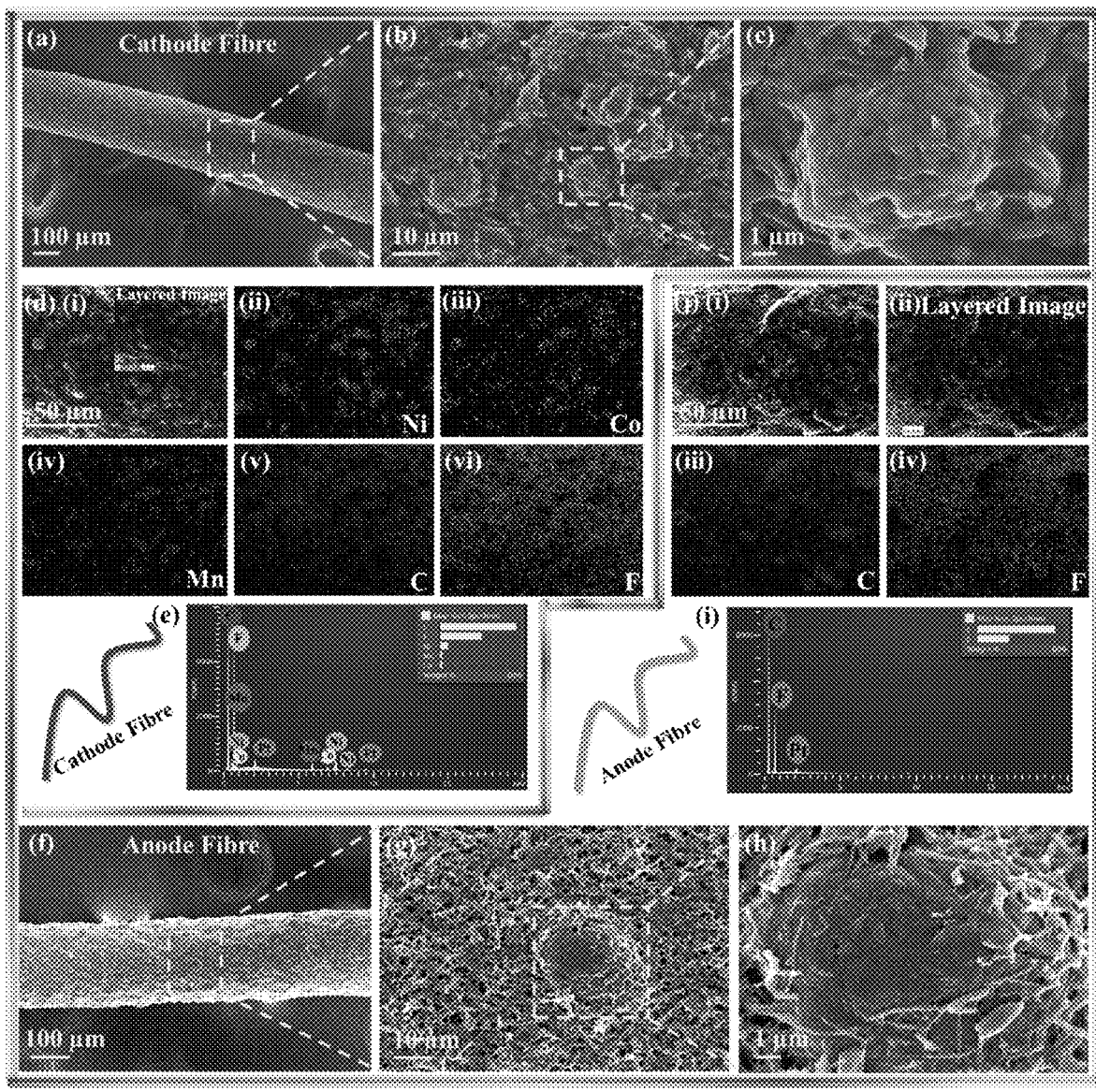
FIG. 4 shows the results of analyzing the skeleton arrangement and active material distribution of an electrode fiber according to an embodiment of the present invention.

Experimental Example 1-3: Analysis of Elemental Composition of Electrode Fiber FIG. 4 shows the results of photographing high-resolution images using HR FE-SEM and analyzing the skeleton arrangement and active material distribution of electrode fiber.

Referring to FIGS. 4A to 4C, it can be confirmed from the high-resolution image of the positive electrode fiber that the NCM 622 active material was uniformly wrapped between the VGCF and PVdF binder. The VGCF is an integrated conductive matrix and allows effective charge transport in the electrode fiber.

Referring to FIGS. 4D(i) to 4D(vi), as a result of performing the element mapping of the positive electrode fiber, it was confirmed that Ni, Co, Mn, C, and F elements were uniformly distributed on the positive electrode fiber surface, and this result is supported by the EDS spectrum of FIG. 4E which confirmed the presence of the elements without impurities. In this case, a platinum element (Pt) additionally identified in the EDS spectrum results from sputtering performed during sample preparation.

Referring to FIGS. 4F to 4H, it can be confirmed from the high-resolution image of the negative electrode fiber surface that the graphite active material was uniformly wrapped between the VGCF and PVdF binder, and the overall surface was rough and porous.

Referring to FIG. 4I, the EDS spectrum of the negative electrode fiber showed the presence of C and F elements, and FIGS. 4J(i) to 4J(iv) show that the graphite active material, the VGCF conductive material, and the PVDF binder were uniformly distributed in the scanning region as a result of the element mapping of the negative electrode fiber.

Experimental Example 1-4: Evaluation of Electrochemical Performance of Electrode Fiber For all of the positive electrode and negative electrode ink compositions, a constant amount of VGCF higher than the transmittance threshold was loaded, and the electrical conductivity of each electrode fiber was measured. The electrochemical performance of the positive electrode fiber and negative electrode fiber was individually evaluated using a CR2032 coin-type battery assembly using lithium metal as a reference electrode, and a triple-layered Celgard 2340 separator was used as a separator.

Figure 5:
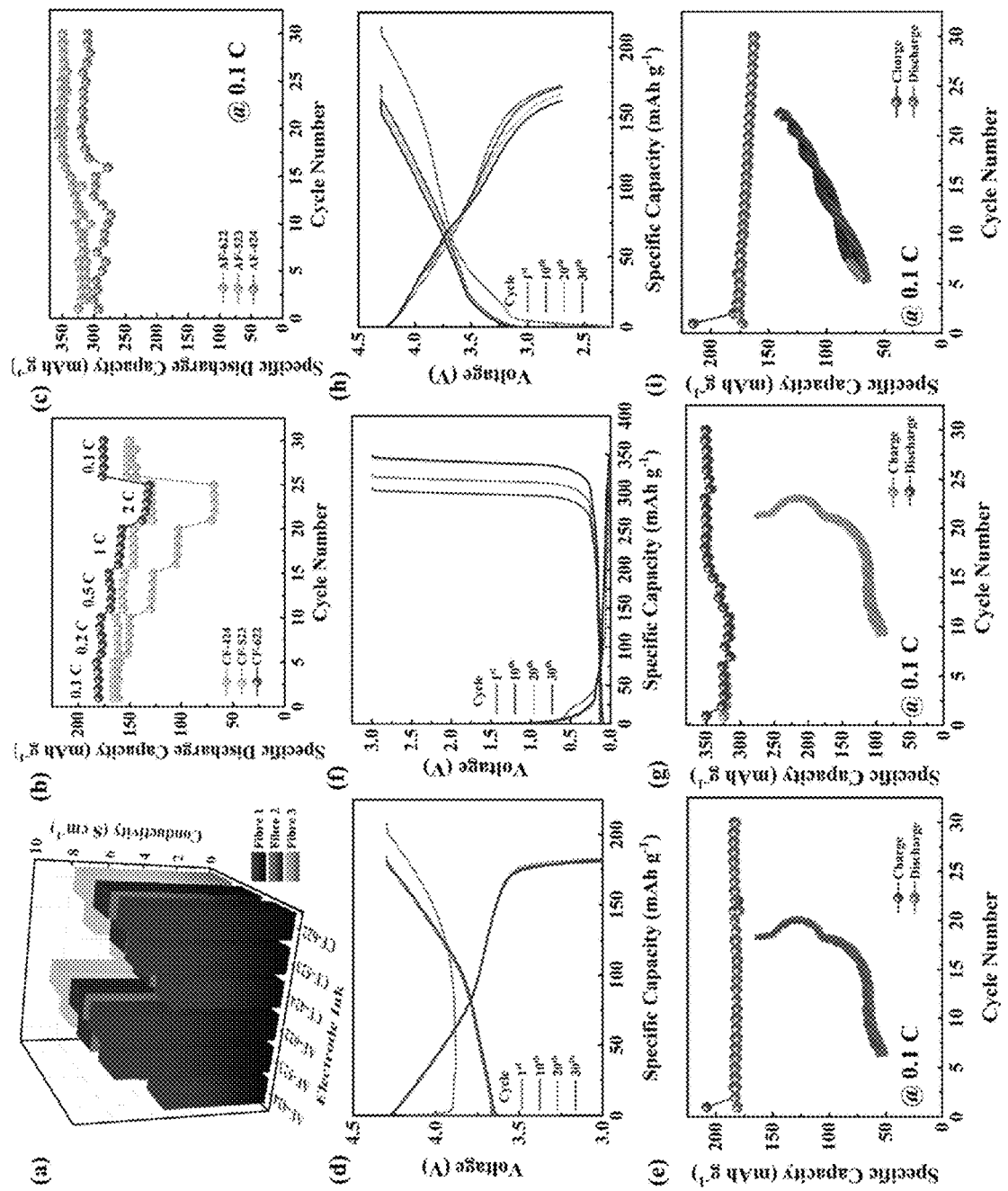
FIG. 5 shows the results of evaluating the electrochemical performance of an electrode fiber according to an embodiment of the present invention.

Referring to FIG. 5A, all of the positive electrode and negative electrode fibers exhibited electrical conductivities of 5 to 9 S cm$^{-1}$, which are sufficient values to provide effective charge transport in the electrode fiber for fabricating a lithium ion battery.

In order to evaluate the electrochemical performance of three positive electrode fibers, the speed performance at current densities of 0.1, 0.2, 0.5, 1, and 2 C was sequentially evaluated and repeated 5 times at a voltage ranging from 3.0 to 4.3 V using an electrochemical cycler (ETH cycler).

Referring to FIG. 5B, it can be confirmed that all of the positive electrode fibers reasonably acted by transferring 80% or more of the NCM 622 active material discharge capacity at a low current density of 0.1 C. Also, in the case of all three positive electrode fibers, a difference in discharge capacity according to a current density was observed. CF-622 having the lowest polymer proportion exhibited excellent performance at low current densities (0.1 to 0.5 C) and high current densities (1 to 2 C), and CF-424 having the highest polymer proportion showed that degradation of electrochemical performance at high current densities was least affected by the polymer content.

The electrochemical performance of three negative electrode fibers was analyzed at a current density of 0.1 C.

Referring to FIG. 5C, it was confirmed that AF-622 and AF-523 provided constant discharge capacities of about 350 mAh g$^{-1}$ after 15 cycles and thus exhibited similar performance, whereas AF-424 exhibited slightly inferior performance.

Among the three positive electrode ink compositions, CF-622 exhibited the best performance in terms of printability, electrical conductivity, and electrochemical performance and thus was chosen as a positive electrode ink composition most suitable for the manufacture of a positive electrode fiber, and the electrochemical performance of the positive electrode fiber manufactured using CF-622 was evaluated with a half-cell at room temperature at a voltage ranging from 3.0 to 4.3 V and a current density of 0.1 C.

FIG. 5D shows a charge/discharge curve at an interval of 10 cycles. The positive electrode fiber CF-622 exhibited an initial specific charge capacity of about 208 mAh g$^{-1}$ and an initial specific discharge capacity of 181 mAh g$^{-1}$, and a plateau was observed at about 3.7 V of the discharge curve. Also, it was confirmed that the charge/discharge plateaus of 10, 20, and 30 cycles overlapped, indicating the excellent stability of the CF-622 positive electrode fiber.

Referring to FIG. 5E, the half-cell exhibited an initial coulombic efficiency of 86.9%, then was stabilized, and maintained a coulombic efficiency of 99% or more until the end of 30 cycles. Also, the capacity lost after 30 cycles was less than 2 mAh g$^{-1}$, and the capacity retention rate was 99% or more.

In a similar manner to the positive electrode ink composition, AF-523 that exhibited the best performance in terms of printability, electrical conductivity, and electrochemical performance was chosen as a negative electrode ink composition suitable for the manufacture of a negative electrode fiber. The electrochemical performance of the negative electrode fiber manufactured using AF-523 was evaluated with a half-cell at room temperature at a voltage ranging from 0.01 to 3.0 V and a current density of 0.1 C.

FIG. 5F shows a charge/discharge curve at an interval of 10 cycles, and an initial specific discharge capacity of about 350 mAh g$^{-1}$ and an initial specific charge capacity of 324 mAh g$^{-1}$ were exhibited. The potential plateau of the first discharge cycle was observed at about 850 mV, which corresponds to graphite separation in the presence of an organic electrolyte. Discharge capacities of 316, 349, and 350 mAh g$^{-1}$ were exhibited after 10, 20, and 30 cycles.

Referring to FIG. 5G, the half-cell exhibited an initial coulombic efficiency of 92%, then was stabilized, and maintained a coulombic efficiency of about 99.6% until the end of 30 cycles.

A coin-type battery including the half-cells AF-523 and CF-622 chosen through this experimental example was fabricated, and the electrochemical performance thereof was evaluated at a voltage ranging from 2.7 to 4.3 V and a current density of 0.1 C.

FIG. 5H shows a charge/discharge curve at an interval of 10 cycles, the average discharge potential plateau of all cycles was observed at about 3.5 V, and an initial specific charge capacity of 210 mAh g$^{-1}$ and an initial specific discharge capacity of 172 mAh g$^{-1}$ were exhibited. An initial irreversible loss capacity was 38 mAh g$^{-1}$, and specific discharge capacities of 171, 166, and 162 mAh g$^{-1}$ were exhibited after 10, 20, and 30 cycles.

Referring to FIG. 5I, the battery exhibited an initial coulombic efficiency of 82%, then was stabilized, and maintained a coulombic efficiency of 99% or more. Also, the capacity lost after 30 cycles was less than 12 mAh g$^{-1}$, and the capacity retention rate was 94%.

Experimental Example 1-5: Fabrication and Evaluation of Lithium Ion Battery in the Form of Twisted Yarn Lithium ion batteries in the form of twisted yarn were fabricated using the CF-622 positive electrode fiber and AF-523 negative electrode fiber chosen through Experimental Example 1-4.

Each of the CF-622 positive electrode fiber and the AF-523 negative electrode fiber was twisted to manufacture an electrode assembly in the form of twisted yarn. Each of the positive electrode assembly and the negative electrode assembly was immersed in a PVdF-HFP separator composition to form a separator coating, and then they were assembled in a high-purity Ar-filled glove box with a moisture and oxygen content of less than 1.0 ppm. A thin metal wire was tied at the end of each electrode assembly to manufacture a metal tab for connection to an external device. The separator-coated electrode assemblies were twisted and placed in a heat shrinkable tube, a reversible thixotropic gel electrolyte was injected thereto, and then the edge of the tube was sealed. The lithium ion batteries in the form of twisted yarn fabricated by the above method exhibited mass loads of 11.7 mg cm$^{-1}$ and 7.8 mg cm$^{-1}$ with respect to the positive electrode and negative electrode fibers, respectively.

Figure 6:
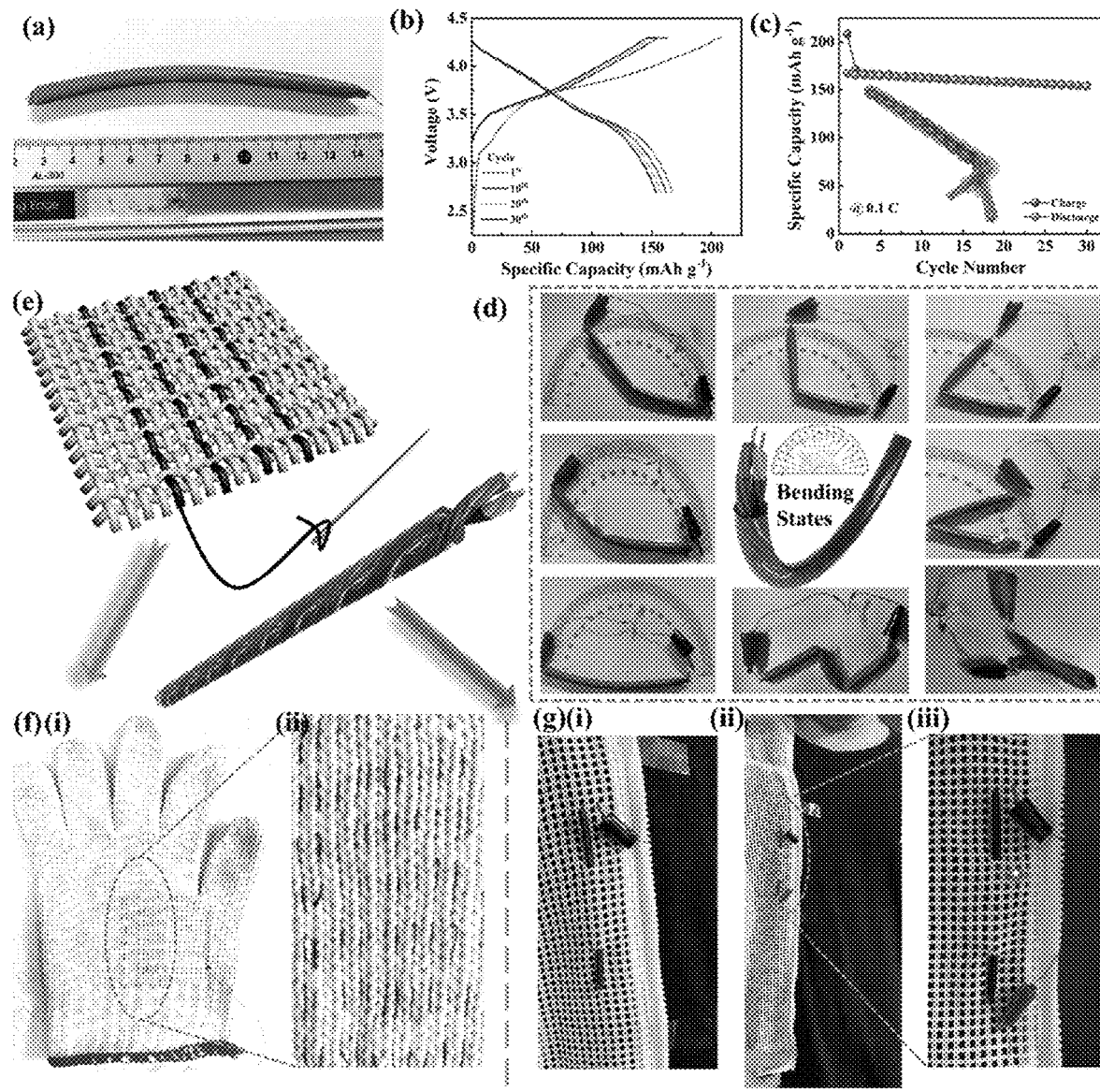
FIG. 6 shows the results of evaluating the electrochemical performance and durability of an ion battery according to an embodiment of the present invention and the images illustrating the application thereof to a smart wearable device.

FIG. 6A shows a photograph of the lithium ion battery in the form of twisted yarn fabricated by the above method.

In order to evaluate the durability of the lithium ion battery in the form of twisted yarn, the battery was taken out of the glove box, and the electrochemical performance thereof was evaluated at a voltage ranging from 2.7 to 4.3 V and a current density of 0.1 C using an ETH cycler.

FIG. 6B shows a charge/discharge curve at an interval of 10 cycles, and an initial specific charge capacity of 206 mAh g$^{-1}$ and an initial specific discharge capacity of 166 mAh g$^{-1}$ were exhibited. An initial irreversible loss capacity was 40 mAh g$^{-1}$ and decreased in the subsequent cycles, and specific discharge capacities of 161, 157, and 153 mAh g$^{-1}$ were exhibited after 10, 20, and 30 cycles.

Referring to FIG. 6C, an initial coulombic efficiency was 80.5%, increased up to 96.3% in the second cycle, and maintained at 99% or more in the subsequent cycles. Also, the capacity lost after 30 cycles was less than 14 mAh g$^{-1}$, and the capacity retention rate was 92%. This is a value suitable for supplying energy to wearable devices.

Since the battery used in wearable devices is repeatedly bent during long-term use, durability against bending was evaluated in addition to electrochemical performance.

FIG. 6D shows the lithium ion battery in the form of twisted yarn with various degrees of bending, and as a result of evaluation by connecting a red LED, no change in LED brightness was observed at various degrees of bending, and thus it was confirmed that durability against bending was excellent.

FIG. 6E shows a schematic diagram illustrating the application of the battery to a commercial wearable device. FIGS. 6F(i) and 6F(ii) show an example of the printed electrode fiber applied to a fiber wearable device by being woven into a glove. FIGS. 6G(i) to 6G(iii) show an example of the battery applied to a fiber wearable device, and as a result of evaluation by connecting a red LED, it was confirmed that light was emitted for several minutes.

Figure 7:
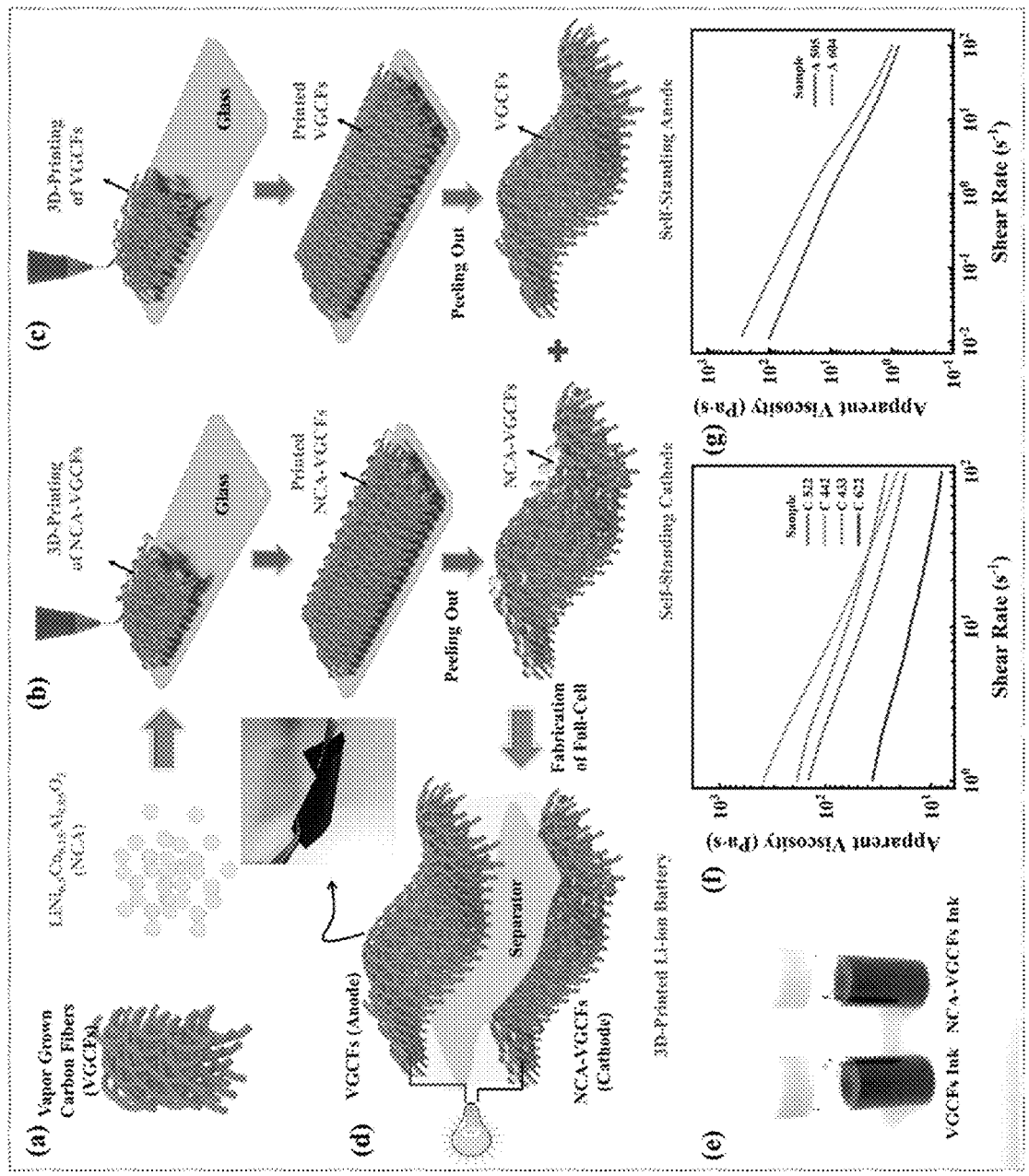
FIG. 7 shows a self-standing electrode according to an embodiment of the present invention and the properties of an ink composition used therein.

A method of fabricating a secondary battery using a self-standing electrode is summarized in Examples 2-1 to 2-3 and briefly shown in FIG. 7. Hereinafter, to confirm the optimal printing conditions for manufacturing a self-standing electrode, NCA which is a commercially available positive electrode active material having excellent stability was used. VGCFs are suitable for the manufacture of a self-standing electrode by having high conductivity, wettability, and an ability to form a pervasive network structure. Also, VGCFs, which are carbon allotropes, can be applied as negative electrode materials by having the coil and stacked arrangement characteristics of a graphene sheet.

Example 2-1: Manufacture of Electrode Ink

The properties of an electrode ink composition for manufacturing a self-standing electrode are shown in the following Table 2.

TABLE 2

| Classification | Composition | Compositional ratio | σ (S cm$^{-1}$) | TS (MPa) | Discharge capacity (mAh g$^{-1}$ @ 0.1 C.) |
|---|---|---|---|---|---|
| C 522 | NCA:VGCF:PVdF | 50:25:25 | 3.74 | 4.03 | 197 |
| C 442 | NCA:VGCF:PVdF | 40:40:20 | 3.95 | 1.11 | 176 |
| C 433 | NCA:VGCF:PVdF | 40:30:30 | 1.10 | 8.91 | 170 |
| C 424 | NCA:VGCF:PVdF | 40:20:40 | 1.79 | 11.40 | 180 |
| C 622 | NCA:VGCF:PVdF | 60:20:20 | 2.40 | 4.23 | 187 |
| A 505 | VGCF:PVdF | 50:50 | 4.59 | 3.53 | 150 |
| A 604 | VGCF:PVdF | 60:40 | 5.18 | 3.24 | 220 |

Referring to Table 2, each electrode ink composition was prepared by dissolving an active material, a conductive material (VGCF), and a polymer binder (PVdF) in a specific content ratio in 5 mL of an NMP solvent. Generally, in the preparation of the electrode ink composition, PVdF was dissolved in NMP, and then VGCFs and an active material were sequentially added and then uniformly dissolved for 30 minutes. The prepared electrode ink composition was injected into a syringe barrel for three-dimensional printing. As the syringe barrel, a 30 mL syringe barrel attached to a fluid body seat equipped with a tappet flat nozzle having a diameter of 0.8 mm was used. In order to impart a viscosity suitable for three-dimensional printing, the electrode ink composition was maintained to have a solid content of 80 mg mL$^{-1}$.

Example 2-2: Manufacture of Electrode

The electrode ink composition was printed using an extrusion-type desktop printer (E2, Nordson EFD). The extrusion speed and extrusion pressure were controlled to be 50 mm and 80 psi, respectively, using a CCNT-25S Pro compressor. The electrode ink composition was printed on a glass substrate that had been pre-treated and washed to easily separate the electrode. The printed electrode and glass substrate were dried on a hot plate set at 110° C. for 15 minutes to remove a solvent and additionally dried in a vacuum oven set at 120° C. overnight. The dried electrode was separated using a razor blade to obtain a self-standing electrode.

Example 2-3

The self-standing electrode manufactured in Example 2-2, a Celgard 2340 separator, and a lithium metal reference electrode were used to fabricate a CR2032 coin-type battery cell, and then the electrochemical performance of the self-standing electrode was analyzed. A liquid electrolyte was prepared by dissolving 1.0 M lithium hexafluorophosphate ($LiPF_6$) in a solution obtained by mixing ethylene carbonate (EC) and diethyl carbonate (DEC) in a volume ratio of 1:1. All battery cells were assembled in an Ar-filled glove box with a moisture and oxygen content of less than 1.0 ppm. A constant current charge/discharge test was performed using a multi-channel battery measurement system (ETH cycler). The fixed potential window of the NCA-VGCF-based self-standing positive electrode was 3.0 to 4.0 V, and the fixed potential window of the VGCF-based self-standing negative electrode was 0.01 to 3 V. The full-cell including the NCA-VGCF positive electrode and the VGCF negative electrode had a fixed potential window ranging from 2.7 to 4.3 V. The rate characteristics of half-cells with various positive electrode composition ratios was analyzed by performing 5 cycles at different constant current discharge rates of 0.1 C, 0.2 C, 0.5 C, 1 C, and 2 C in the same manner and then returning to 0.1 C.

Experimental Example 2-1: Analysis of Adhesive Properties of Electrode

In order to manufacture a self-standing electrode without damage in Example 2-2, the selection of the type and content of the binder and the type of the substrate is important. The amount of PVdF used as the binder determines the adhesive properties between the substrate and the self-standing electrode. When an excessive amount of the binder is used, the adhesive strength between the substrate and the electrode may become weak. When a glass substrate is used, the electrode may be separated without any physical damage. Also, since the hydroxyl group on the glass surface imparts hydrophilicity to the material and the fluoride group of PVdF imparts hydrophobicity to the material, the electrode may be more easily separated.

As shown in Table 2, various experiments were performed while varying the ratio of components, and the mechanical, electrical, and electrochemical analyses thereof were performed.

Experimental Example 2-2: Rheological Behavior of Electrode Ink Composition

In order to implement a high-resolution printing pattern, it is necessary to control the rheological properties of the electrode ink composition. When the composition of the ink varies as shown in Table 2, the rheological behavior is changed. The apparent viscosity and shear rate of the positive electrode and negative electrode ink compositions, as confirmed by a rheometer, are graphically shown in FIGS. 7F and 7G.

Referring to FIGS. 7F and 7G, all of the ink compositions exhibited excellent shear thinning behavior at high shear rates and thus were suitable for uniform printing through a nozzle. When C 442 having a VGCF content of 40% was compared with C 622 having a VGCF content of 20%, viscosity increased as the proportion of VGCFs increased. When A 604 and A 505 were compared, a similar pattern was shown in the negative electrode ink compositions.

Experimental Example 2-3: Mechanical Behavior of Self-Standing Electrode

Figure 8:
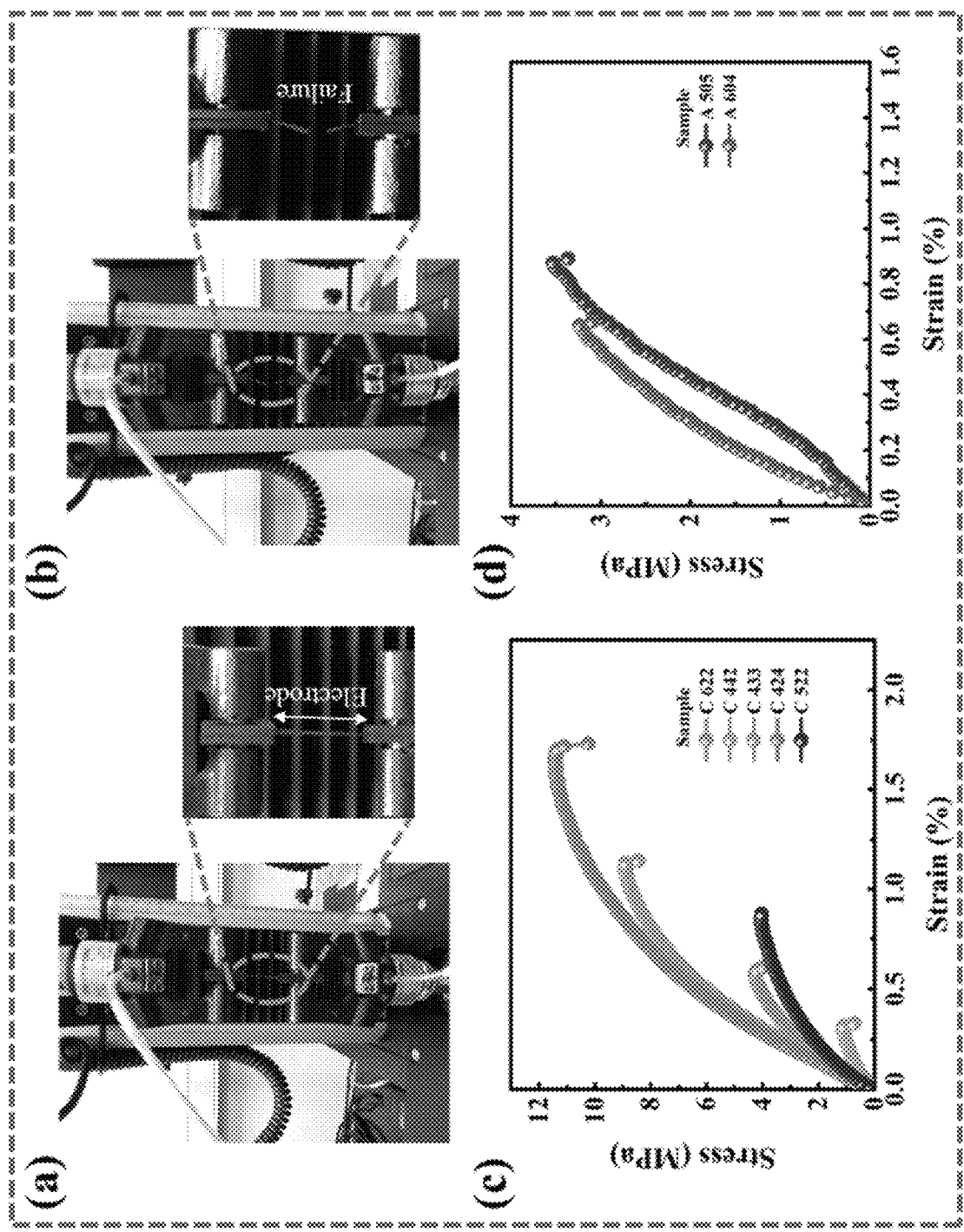
FIG. 8 shows a method of measuring the mechanical properties of a self-standing electrode according to an embodiment of the present invention and results thereof.

The stress strain curves of the self-standing positive electrode and self-standing negative electrode manufactured in Example 2-2 are shown in FIG. 8. Tensile stress is a force that a material exerts to restore its shape and tension against an external force, and tensile strain is the degree of deformation of an object due to an external force. In all stress strain curves, a similar pattern to that in the rheological study was found.

As shown in FIG. 8A, no external force was applied to the stationary phase at the beginning of the experiment. When the yield phenomenon of the material occurred due to tension, a quasi-linear behavior was shown, and then the electrode was irreversibly deformed. When the breaking point was reached, the material was torn as shown in FIG. 8B.

Referring to the various stress strain curves of FIGS. 8C and 8D, as the amount of the polymer included in the electrode increased, mechanical properties indicated by the maximum tensile stress were improved. For example, C 424 having the highest polymer content exhibited a highest maximum tensile stress of 11.4 MPa at 1.6% strain, and C 442 having the lowest polymer content exhibited a maximum tensile stress of 1.11 MPa at 0.3% strain. A similar pattern was shown in the negative electrodes.

C 424 exhibited a tensile stress of 11.4 MPa at 1.59% strain, whereas A 604 exhibited a tensile stress of 3.2 MPa at 0.6% strain despite having the same polymer content of 40%, and thus it can be seen that as an excessive amount of VGCFs is added, mechanical properties are degraded. This may be because VGCFs interfered with the binder and cleaved the polymer matrix chain.

Figure 9:
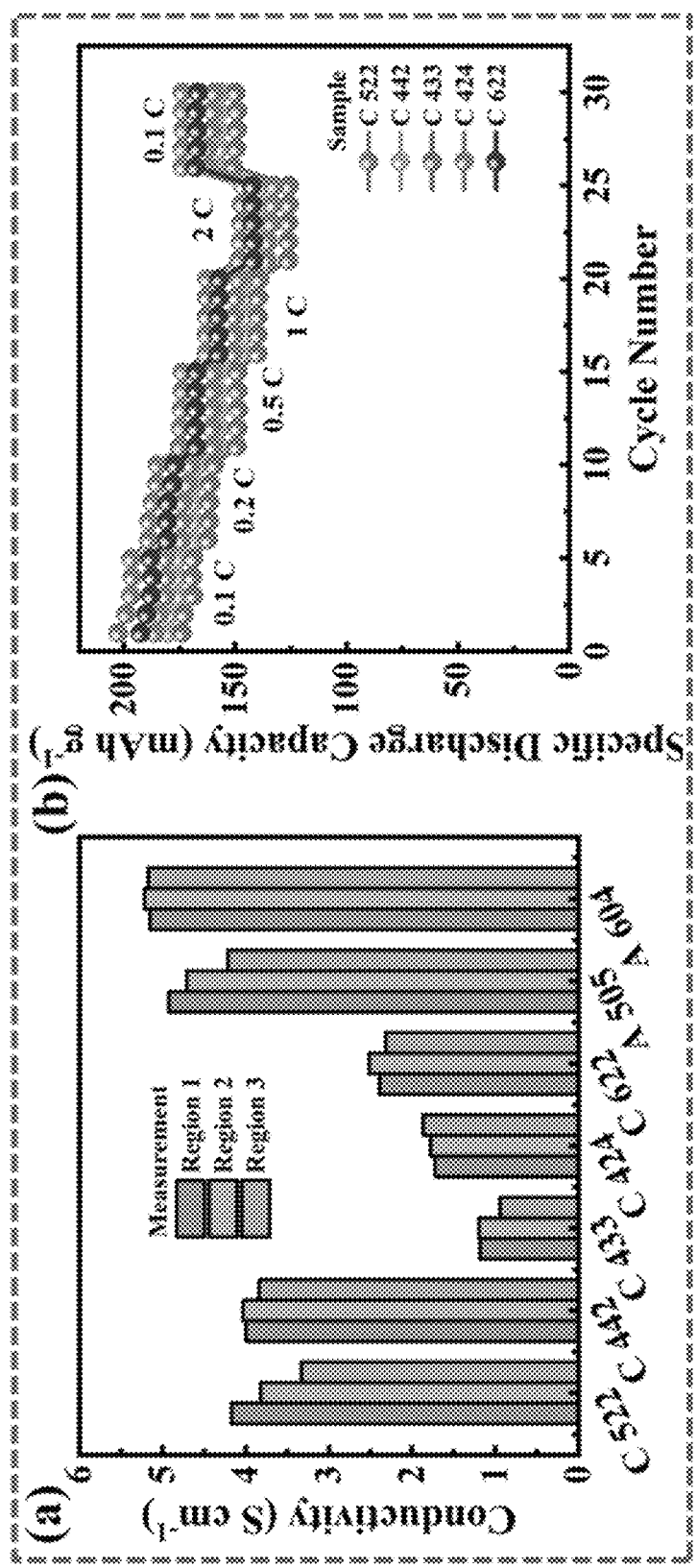
FIG. 9 shows the electrochemical performance of a self-standing electrode according to an embodiment of the present invention.

Experimental Example 2-3: Electrical Conductivity and Rate Capability of Self-Standing Electrode The electrical conductivity of each electrode is shown in Table 2 and FIG. 9.

Referring to Table 2 and FIG. 9A, VGCFs were capable of improving the conductivity of the self-standing electrode and the wettability and homogeneity in the ink suspension.

All of the electrodes exhibited conductivities of 1.1 to 5.1 $S\ cm^{-1}$ which were sufficient for battery electrodes. Generally, conductivity increases as a VGCF content increases, but C 433 exhibited low conductivity despite having a high VGCF content. In this case, the decrease in conductivity may be because the polymer infiltrated into the interparticle space due to a high polymer content such that the electrolyte was prevented from permeating.

FIG. 9B shows the electrochemical performance of each half-cell fabricated using the self-standing electrode. The specific discharge capacity of all electrodes at a low constant current discharge rate of 0.1 C was 62.00% or more, which was a theoretically acceptable level of characteristics for NCA. As a polymer content increased, rate capability decreased. C 522 and C 622 having low polymer contents exhibited specific discharge capacities of 197 mAh g$^{-1}$ and 187 mAh g$^{-1}$ at 0.1 C and specific discharge capacities of 147 mAh g$^{-1}$ and 142 mAh g$^{-1}$ at 2 C, respectively. C 433 and C 424 having high polymer contents exhibited inferior results to those of C 522 and C 622. Comparing the electrochemical performance, mechanical stability and electrical conductivity of each electrode, C 522 and C 622 were more suitable for the positive electrode. Particularly, C 522 exhibited the most optimal performance.

Experimental Example 2-4: Physicochemical Properties of Self-Standing Electrode

Figure 10:
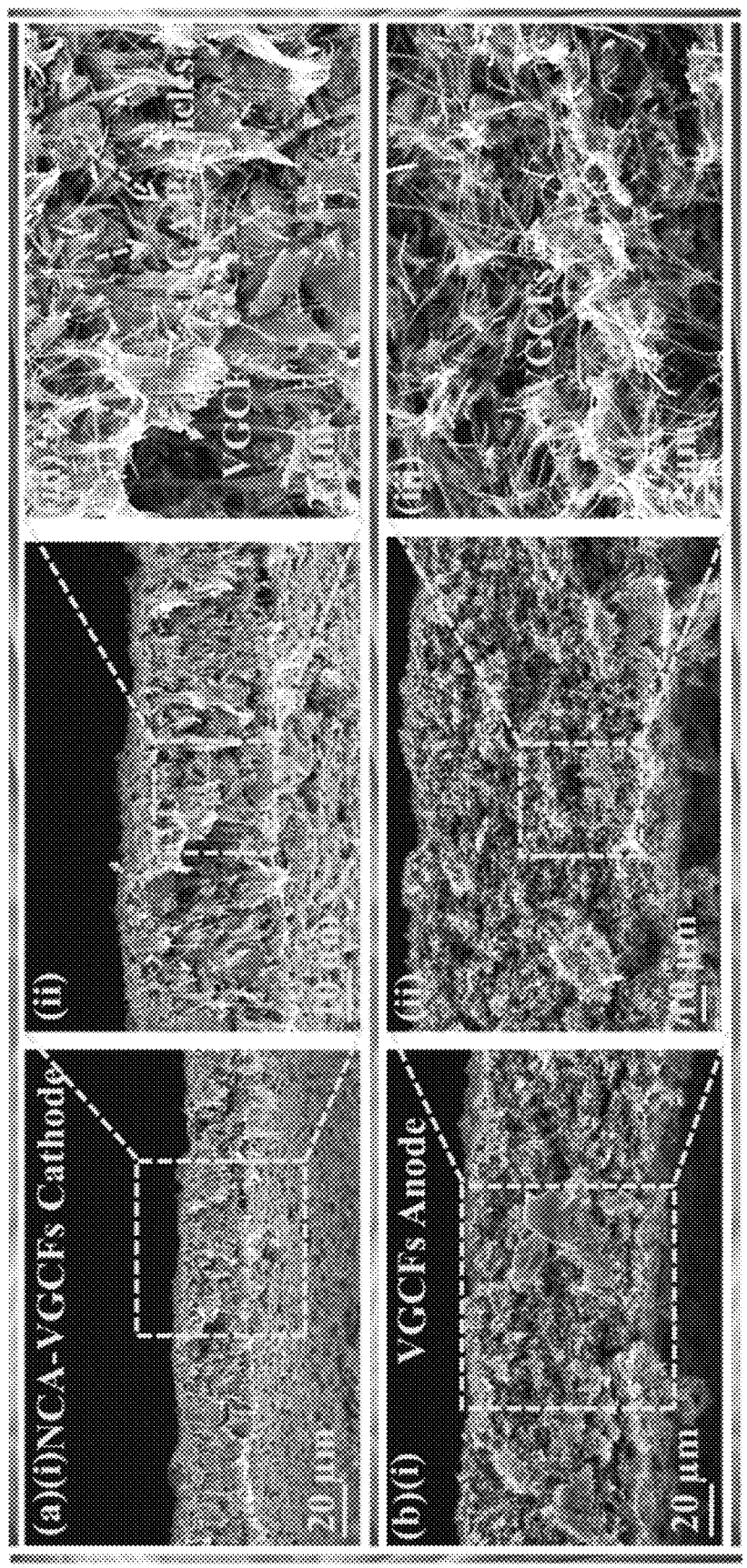
FIG. 10 shows the SEM images of a self-standing electrode according to an embodiment of the present invention.

The cross-sectional HR FE-SEM images for analyzing the mechanical stability and electrochemical performance of the electrodes are shown in FIG. 10. It can be confirmed from FIGS. 10A(i) and 10B(i), which are low magnification images, that all components were uniformly dispersed throughout the electrode surface in both samples. Also, referring to FIG. 10A, since the C 522 positive electrode material exhibited excellent porosity throughout the surface, it can provide a high diffusion pathway for ion migration and exhibit improved electrochemical performance. However, the pores may hinder the mechanical properties of the self-standing electrode. Similarly, referring to FIG. 10B, the A 604 negative electrode material also had a porous structure, but exhibited a relatively high-density interconnection network structure.

Experimental Example 2-5: Electrochemical Properties of Self-Standing Electrode

Figure 11:
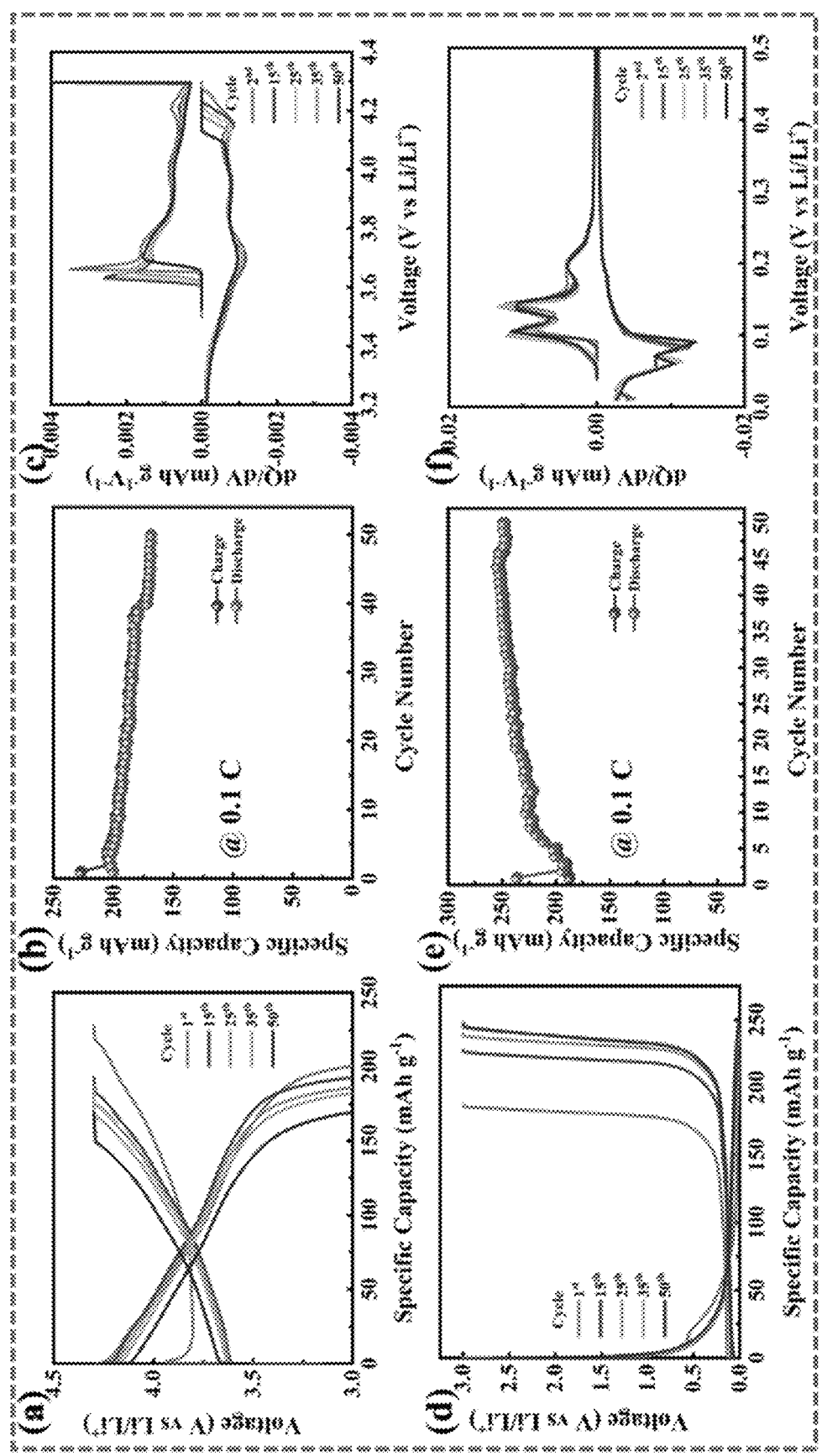
FIG. 11 shows the electrochemical properties of a half-cell including a self-standing electrode according to an embodiment of the present invention.

Electrochemical performance was analyzed using a half-cell including the C 522 positive electrode, and results thereof are shown in FIG. 11. FIG. 11A shows the constant current charge/discharge curve of the NCA-VGCF positive electrode half-cell using Li as a reference electrode. Initial specific charge and discharge capacities at a current rate of 0.1 C and a potential window of 3.0 to 4.3 V were 227 mAh g$^{-1}$ and 200 mAh g', respectively, resulting in a coulombic efficiency of 88.10%. As the cycles proceeded, coulombic efficiency increased up to 98%. FIG. 11B shows cycle performance for 50 cycles at a current rate of 0.1 C, and a capacity retention rate after 50 cycles was about 84%. Conventional VGCFs have been mainly used as a conductive material or dopant to increase electrochemical performance, but VGCFs can exhibit similar electrochemical performance to that of graphite at a cycle with less than 0.5 V due to having a graphite structure like a stacked cup.

Referring to the electrochemical performance of the A 604 self-standing negative electrode shown in FIG. 11D, an initial coulombic efficiency of 79.23% and an initial specific discharge capacity of 187 mAh g$^{-1}$ were exhibited at a current rate of 0.1 C and a potential window of 0.01 to 3.0 V, and coulombic efficiency increased up to 100% after several cycles. FIG. 11E shows the performance of the negative electrode for 50 cycles at a current rate of 0.1 C, and it can be confirmed that 220 mAh g$^{-1}$, which was a charge/discharge capacity after 10 cycles, gradually increased up to 249 mAh g$^{-1}$ after 50 cycles. Also, as a polymer content increased, the pores were filled with the polymer to block the diffusion path of the electrode, and thus electrochemical performance was degraded.

FIGS. 11C and 11F show the results of analyzing the differential capacity (dQ/dV) of the self-standing electrode, and the cell degradation mechanism and the phase transition characteristics of the electrode material can be confirmed from the results. The NCA-VGCF half-cell of FIG. 11C exhibits an oxidation plateau of 4.0 V or more, indicating that oxygen is removed at the lattice point and delithiation was performed. The phase transition from hexagonal H2 to H3 can be confirmed from the voltage analysis diagram. In the second cycle, the oxidation peak at 4.2 V corresponds to a lithium ion extracted from the lattice structure, and the reduction peak at 4.17 V corresponds to a lithium ion inserted into the lattice structure. Also, the intensity of the oxidation peak decreased at the 50$^{th}$ cycle, but the reduction peak shifted to 4.08 V. This shift of the reduction peak to the lower range is usually due to the migration of transition metal ions from the transition metal layer to lithium.

Similarly, FIG. 11F shows the dQ/dV graph for the VGCF self-standing negative electrode, and a similar pattern to that of graphite was shown. Reduction peaks were observed at 90 mV and 60 mV, and the corresponding oxidation peaks were observed at 203 mV, 143 mV, and 103 mV, which results from the mechanism of intercalation and deintercalation of lithium ions between graphene layers.

Figure 12:
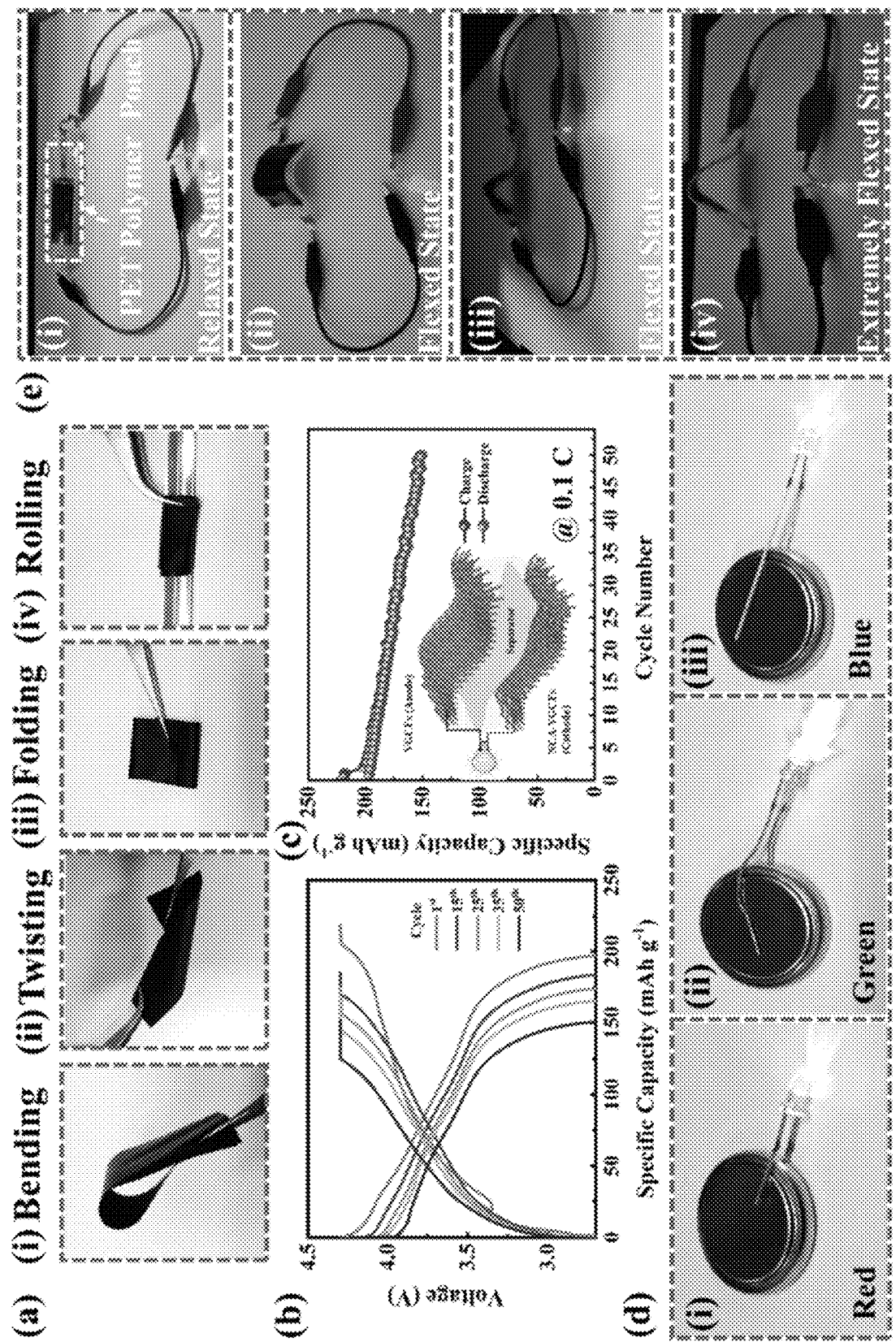
FIG. 12 shows the properties of a flexible battery including a self-standing electrode according to an embodiment of the present invention.

The properties of the NCA-VGCF positive electrode/VGCF negative electrode full-cell are shown in FIG. 12. FIG. 12A shows the evaluation of flexibility of the self-standing electrode by bending, twisting, folding, and rolling on a glass rod. It can be confirmed that the electrode was not torn and had flexibility.

FIGS. 12B and 12C show a constant current charge/discharge curve, and initial specific charge and discharge capacities of 218 mAh g$^{-1}$ and 197 mAh g$^{-1}$ were exhibited. The coulombic efficiency of the initial cycle at a potential window of 2.7 to 4.3 V and a current rate of 0.1 C was 90.3% and increased up to 98% as the cycles continuously proceeded. A capacity retention rate after cycling the full-cell for 50 cycles at a current rate of 0.1 C was 76.14%.

FIG. 12D shows that the charged full-cell is applied to a light emitting diode (LED).

A prototype of a pouch cell was manufactured using the self-standing electrode and sealed in a PET polymer transparent case, and a change in battery characteristics due to physical change was confirmed and shown in FIG. 6E.

The self-standing electrode maintained its function all in a relaxed state (FIG. 12E(i)), bent state (FIGS. 12E(ii) and 12E(iii)), and extremely bent state (FIG. 12E(iv)). That is, the battery fabricated using the self-standing electrode is able to be charged and discharged even while being extremely bent 90° or more to supply current.

According to the method of fabricating an ion battery for a smart wearable device according to one aspect of the present invention, an ion battery can be fabricated in the form of a one-dimensional fiber and thus can be effectively applied to a smart wearable device that requires flexibility.

In addition, the ion battery for a smart wearable device according to another aspect of the present invention can be applied to not only a smart wearable device but also various smart wearable electronic devices due to having excellent electrochemical performance and excellent durability.

According to still another aspect, a self-standing electrode that is able to function as an electrode without a metal current collector can be easily manufactured using three-dimensional printing, and thus a flexible battery including the same can also be fabricated.

However, it is to be understood that the effects of the present invention are not limited to the above-described effects but include all effects deducible from the configuration described in the detailed description of the present invention or in the claims.

The foregoing description of the present invention is intended for illustration, and it will be understood by those skilled in the art to which the present invention pertains that the present invention can be easily modified and implemented in various other forms without changing the technical spirit or essential features of the present invention. Therefore, it should be understood that the embodiments described above are only exemplary in all aspects and not limiting. For example, each of the constituents described as being one combined entity may be implemented separately, and similarly, constituents described as being separate entities may be implemented in a combined form.

It should be understood that the scope of the present invention is defined by the following claims and that all changes or modifications derived from the meaning and scope of the claims and their equivalents are included in the scope of the present invention.

The national R&D projects of Korean which supported this invention are shown in the following Table 3.

TABLE 3

| Assignment No | 1711116659 | — | |
| --- | --- | --- | --- |
| Assignment management agency No | 2017H1D8A2031138 | 2020K1A3A1A48111073 | P0017363 |
| Department name | Ministry of Science and ICT | Ministry of Science and ICT | Ministry of Trade, Industry and Energy |
| Research management agency | National Research Foundation of Korea | National Research Foundation of Korea | Korea Institute for Advancement of Technology |
| Research project name | Next-generation engineering researcher nurturing project | Korea-Germany 2 + 2 industry-academic joint research project | Industrial innovation talent growth support (R&D) |
| Research assignment title | Future clean smart energy platform research Next-generation engineering researcher nurturing project | Design of material for sodium solid-state battery and interface | Fostering of professional manpower for practical use of functional organic/inorganic composite material |
| Supervising organization | Kyung Hee University (Global Campus) Industry-Academic Cooperation Foundation | Kyung Hee University (Global Campus) Industry-Academic Cooperation Foundation | Korea Petrochemical Industry Association |
| Research period | 2017 May 1~2022 Feb. 28 | 2020. Nov. 27~2023 Nov. 26 | 2021 Mar. 1~2026 Feb. 28 |
| Contribution rate | 0.5 | 0.4 | 0.1 |

What is claimed is:

1. A method of fabricating an ion battery for a smart wearable device, the method comprising the steps of:
   (a) continuously press-printing each of a positive electrode ink composition and a negative electrode ink composition in a coagulation bath and drying the each of the positive electrode ink composition and the negative electrode ink composition to manufacture electrode fibers;
   (b) twisting the electrode fibers to manufacture at least one electrode assembly;
   (c) coating the electrode assembly with a separator composition; and
   (d) placing the at least one electrode assembly in a heat shrinkable tube and introducing a gel electrolyte,
   wherein the at least one electrode assembly of the step (d) comprises at least one positive electrode assembly and at least one negative electrode assembly,
   the press-printing of the step (a) is a 3D printing in which an ink is injected through a nozzle while being pressurized,
   the positive electrode ink composition comprises a positive electrode active material, a binder, a conductive material, and a solvent, and
   the positive electrode active material comprises alkali metal-based oxide particles or alkaline earth metal-based oxide particles represented by the following chemical formula:

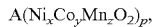

wherein A is Li, Na, or Mg, and
   p, x, y, and z are real numbers satisfying $0 \leq p \leq 2$, $0 \leq x \leq 1$, $0 \leq y \leq 1$, and $0 \leq z \leq 1$, respectively.

2. The method of claim 1, wherein the negative electrode ink composition comprises a negative electrode active material, a binder, a conductive material, and a solvent, and the negative electrode active material is one selected from the group consisting of natural graphite, Kish graphite, pyrolytic carbon, mesophase pitch-based carbon fiber, meso-carbon microbeads, mesophase pitches, petroleum-derived cokes, coal-derived cokes, silicon, silicon oxide, silicon-metal alloys, and a combination thereof.

3. The method of claim 2,
   wherein with respect to 100 parts by weight of the positive electrode active material, the positive electrode ink composition comprises 10 to 50 parts by weight of the binder of the positive electrode ink composition and 10 to 30 parts by weight of the conductive material of the positive electrode ink composition, and
   wherein with respect to 100 parts by weight of the negative electrode material, the negative electrode ink composition comprises 10 to 50 parts by weight of the binder of the negative electrode ink composition and 10 to 30 parts by weight of the conductive material of the negative electrode ink composition.

4. The method of claim 1, wherein each of the electrode fibers has a diameter of 100 to 400 μm.

5. The method of claim 1, wherein a printing pressure in the step (a) ranges from 10 to 150 psi.

6. The method of claim 1, wherein a printing speed in the step (a) ranges from 1 to 100 mm/s.

7. The method of claim 1, wherein the at least one electrode assembly in the step (d) are placed in a form of twisted yarn in a heat shrinkable tube.

* * * * *